United States Patent
Ito et al.

(10) Patent No.: US 10,404,903 B2
(45) Date of Patent: Sep. 3, 2019

(54) INFORMATION PROCESSING APPARATUS, METHOD, SYSTEM AND COMPUTER PROGRAM

(71) Applicant: Sony Corporation, Tokyo (JP)

(72) Inventors: Ryogo Ito, Tokyo (JP); Kazuma Akamatsu, Tokyo (JP); Keiji Okamoto, Chiba (JP); Yoko Fukata, Tokyo (JP); Shiro Eshita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/126,259

(22) PCT Filed: Jun. 1, 2015

(86) PCT No.: PCT/JP2015/002756
§ 371 (c)(1),
(2) Date: Sep. 14, 2016

(87) PCT Pub. No.: WO2015/194103
PCT Pub. Date: Dec. 23, 2015

(65) Prior Publication Data
US 2017/0085775 A1    Mar. 23, 2017

(30) Foreign Application Priority Data
Jun. 18, 2014   (JP) ................. 2014-125284

(51) Int. Cl.
*H04N 5/232* (2006.01)
*G03B 17/38* (2006.01)
(Continued)

(52) U.S. Cl.
CPC ......... *H04N 5/23206* (2013.01); *G03B 17/38* (2013.01); *G03B 17/565* (2013.01);
(Continued)

(58) Field of Classification Search
CPC ................. H04N 5/23206; G03B 17/565
See application file for complete search history.

(56) References Cited

U.S. PATENT DOCUMENTS 7,373,109 B2 *   5/2008   Pohja ............... G06F 17/30038
                                                    340/539.1
8,457,558 B2 *   6/2013   Hashimoto ........... G06F 3/1454
                                                    235/486
(Continued)

FOREIGN PATENT DOCUMENTS

JP   2009-094591 A1   4/2009
JP   2009-118474 A    5/2009
(Continued)

OTHER PUBLICATIONS

Japanese Office Action dated Mar. 13, 2018 for corresponding Japanese Application No. 2014-125284.

*Primary Examiner* — Cynthia Segura
(74) *Attorney, Agent, or Firm* — Michael Best & Friedrich LLP

(57) ABSTRACT

An information processing apparatus having circuitry that transmit content based on metadata related to the content to an external device in a case that the information processing apparatus is in proximity with the external device. The proximity is detected by short-distance wireless communication. The content is generated and recorded with the metadata in a storage medium of the information processing apparatus based on an operation of the external device. The information processing apparatus receives a recording request from the external device, and in response to the recording request the content is generated and recorded with the metadata in the storage medium.

21 Claims, 19 Drawing Sheets

(51) Int. Cl.
*H04N 5/225* (2006.01)
*H04N 7/18* (2006.01)
*G03B 17/56* (2006.01)
*G03B 29/00* (2006.01)
*G06F 1/16* (2006.01)

(52) U.S. Cl.
CPC .......... *G03B 29/00* (2013.01); *G06F 1/1626* (2013.01); *H04N 5/2252* (2013.01); *H04N 7/185* (2013.01); *G03B 2206/00* (2013.01)

(56) References Cited

U.S. PATENT DOCUMENTS

| | | | | |
|---|---|---|---|---|
| 8,704,915 B2* | 4/2014 | Fujitani | | H04N 1/00236 348/231.2 |
| 8,817,118 B2* | 8/2014 | Hatanaka | | H04N 1/00204 348/143 |
| 9,092,969 B2* | 7/2015 | McCown | | G08B 21/00 |
| 9,124,343 B2* | 9/2015 | Fukui | | H04B 5/02 |
| 9,497,424 B2* | 11/2016 | Kosseifi | | H04N 21/21805 |
| 10,069,999 B2* | 9/2018 | Ito | | H04N 5/225 |
| 2004/0263631 A1* | 12/2004 | Brittan | | H04M 1/72555 348/207.1 |
| 2005/0134707 A1 | 6/2005 | Perotti et al. | | |
| 2005/0140816 A1 | 6/2005 | Tschida et al. | | |
| 2007/0046809 A1* | 3/2007 | Nakamura | | H04N 13/0296 348/362 |
| 2008/0085682 A1* | 4/2008 | Rao | | H04M 1/7253 455/74 |
| 2009/0153692 A1* | 6/2009 | Koide | | H04N 1/00347 348/222.1 |
| 2009/0185033 A1* | 7/2009 | Nozaki | | H04N 5/23219 348/77 |
| 2010/0020186 A1* | 1/2010 | Matsui | | H04N 1/00249 348/211.2 |
| 2010/0214398 A1* | 8/2010 | Goulart | | H04N 21/2387 348/61 |
| 2010/0311347 A1* | 12/2010 | Le Thierry D'ennequin | | H04N 1/32106 455/67.11 |
| 2010/0328469 A1* | 12/2010 | Hashimoto | | G06F 3/1454 348/207.1 |
| 2011/0069179 A1* | 3/2011 | Bathiche | | H04N 5/23206 348/207.1 |
| 2011/0218019 A1* | 9/2011 | Muramatsu | | G06F 17/30265 455/556.1 |
| 2012/0050549 A1* | 3/2012 | Maekawa | | H04N 1/00153 348/207.1 |
| 2012/0262494 A1* | 10/2012 | Choi | | G06F 3/0481 345/672 |
| 2012/0307079 A1 | 12/2012 | Yumiki et al. | | |
| 2013/0004064 A1* | 1/2013 | Yamaguchi | | G06K 9/46 382/164 |
| 2013/0017787 A1* | 1/2013 | Eshita | | H04W 52/0229 455/41.2 |
| 2013/0027569 A1* | 1/2013 | Parulski | | H04N 5/23219 348/207.1 |
| 2013/0072120 A1* | 3/2013 | Wu | | G08C 17/02 455/41.2 |
| 2013/0120592 A1* | 5/2013 | Bednarczyk | | H04N 5/765 348/207.1 |
| 2013/0161383 A1* | 6/2013 | Hashimoto | | H04N 1/00137 235/375 |
| 2013/0182138 A1* | 7/2013 | Cho | | G06F 3/0482 348/211.3 |
| 2013/0206832 A1* | 8/2013 | Hashimoto | | G06F 17/30244 235/375 |
| 2013/0258125 A1* | 10/2013 | Aono | | H04N 5/23216 348/211.4 |
| 2014/0085485 A1* | 3/2014 | Gavita | | H04N 5/23206 348/207.1 |
| 2014/0104443 A1* | 4/2014 | Takahashi | | H04N 1/00347 348/207.1 |
| 2014/0152777 A1* | 6/2014 | Galor | | H04N 5/2254 348/47 |
| 2014/0184830 A1* | 7/2014 | Eom | | H04W 12/04 348/207.11 |
| 2014/0189726 A1* | 7/2014 | Yoneda | | H04N 21/25816 725/25 |
| 2014/0220939 A1* | 8/2014 | Takae | | H04W 12/08 455/411 |
| 2014/0285313 A1* | 9/2014 | Luna | | H04R 3/00 340/4.42 |
| 2014/0354808 A1* | 12/2014 | Hansen | | G06Q 50/10 348/143 |
| 2014/0368671 A1* | 12/2014 | Watanabe | | H04N 5/272 348/207.1 |
| 2014/0375830 A1* | 12/2014 | Ishii | | H04N 5/23206 348/211.2 |
| 2015/0319353 A1* | 11/2015 | Kaneda | | H04N 5/23206 348/211.2 |
| 2016/0301849 A1* | 10/2016 | E | | H04M 1/72533 |
| 2017/0150051 A1* | 5/2017 | Ito | | G03B 15/00 |
| 2017/0163840 A1* | 6/2017 | Ito | | H04N 5/225 |

FOREIGN PATENT DOCUMENTS

| | | |
|---|---|---|
| JP | 2009-267663 A | 11/2009 |
| JP | 2010-087773 A1 | 4/2010 |
| JP | 2011-004389 A | 1/2011 |
| JP | 2011-013856 A | 1/2011 |
| JP | 2013-013063 A | 1/2013 |
| WO | 2014/065127 A1 | 5/2014 |

\* cited by examiner

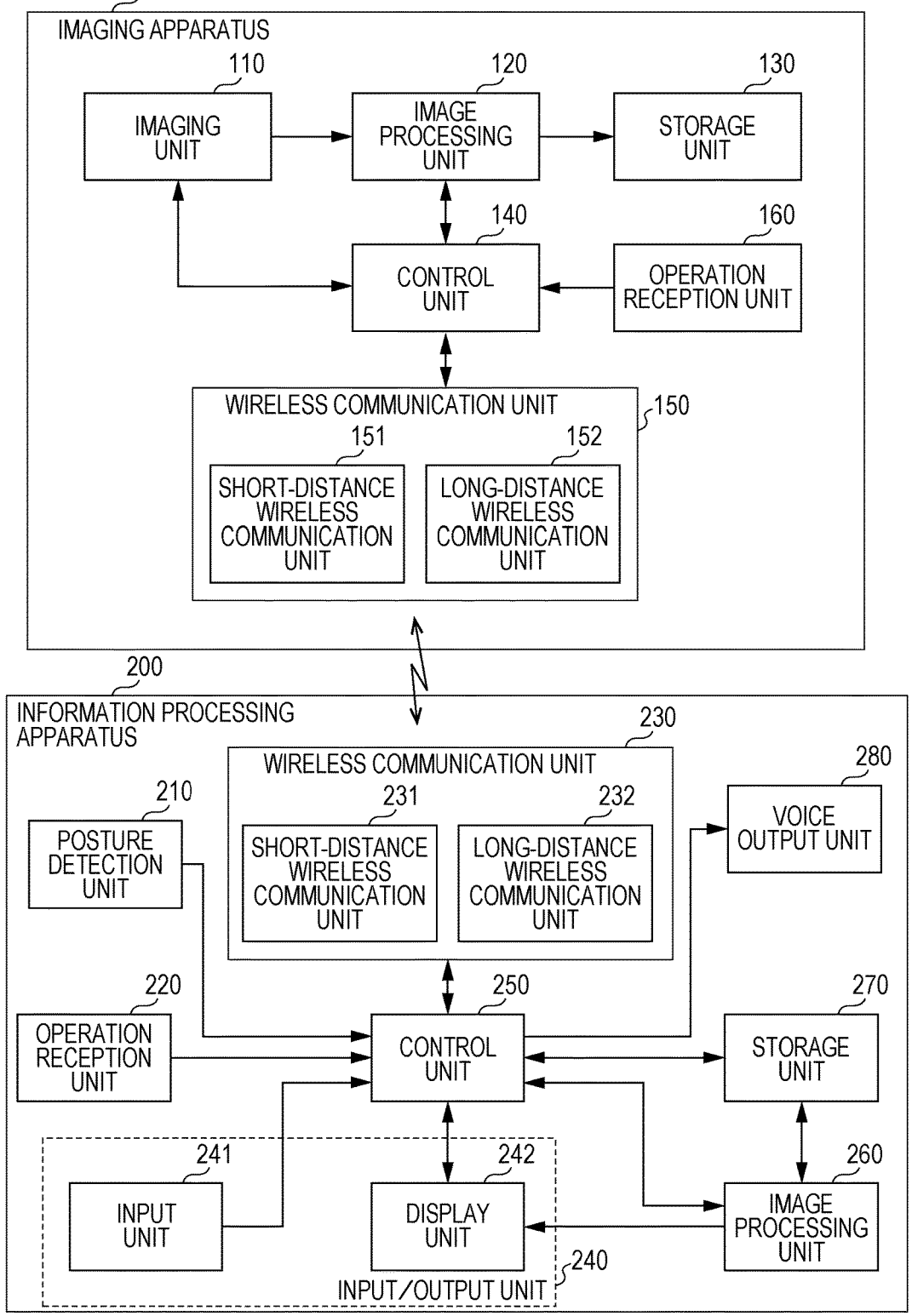

FIG. 6

| CONTENT IDENTIFICATION INFORMATION | PHOTOGRAPHING DATE | TERMINAL IDENTIFICATION INFORMATION | SCENE INFORMATION | INDIVIDUAL FACIAL INFORMATION |
|---|---|---|---|---|
| 1 | 0214/2014 17:45 | ABC-1234 | FACIAL PICTURE | A |
| 2 | 0314/2014 07:21 | DEF-5678 | LANDSCAPE | — |
| 3 | 0414/2014 09:13 | GHIJ-9012 | FACIAL PICTURE | B |
| 4 | 0514/2014 12:23 | ABC-1234 | PICTURE SET | A C |
| ... | ... | ... | ... | ... |

| TERMINAL IDENTIFICATION INFORMATION (401) | INDIVIDUAL FACIAL INFORMATION (402) |
|---|---|
| ABC-1234 | A |
| DEF-5678 | B |
| GHIJ-9012 | C |
| ⋮ | ⋮ |

FIG. 16

| 501 CONTENT IDENTIFICATION INFORMATION | 502 PHOTOGRAPHING DATE | 503 RECORD INSTRUCTING TERMINAL IDENTIFICATION INFORMATION | 504 CONNECTED TERMINAL IDENTIFICATION INFORMATION | |
|---|---|---|---|---|
| 1 | 0214/2014 17:45 | ABC-1234 | ABC-1234 | DEF-5678 | GHIJ-9012 |
| 2 | 0314/2014 07:21 | DEF-5678 | DEF-5678 | – | – |
| 3 | 0414/2014 09:13 | GHIJ-9012 | GHIJ-9012 | DEF-5678 | – |
| 4 | 0514/2014 12:23 | ABC-1234 | ABC-1234 | – | – |
| ... | ... | ... | ... | ... |

500

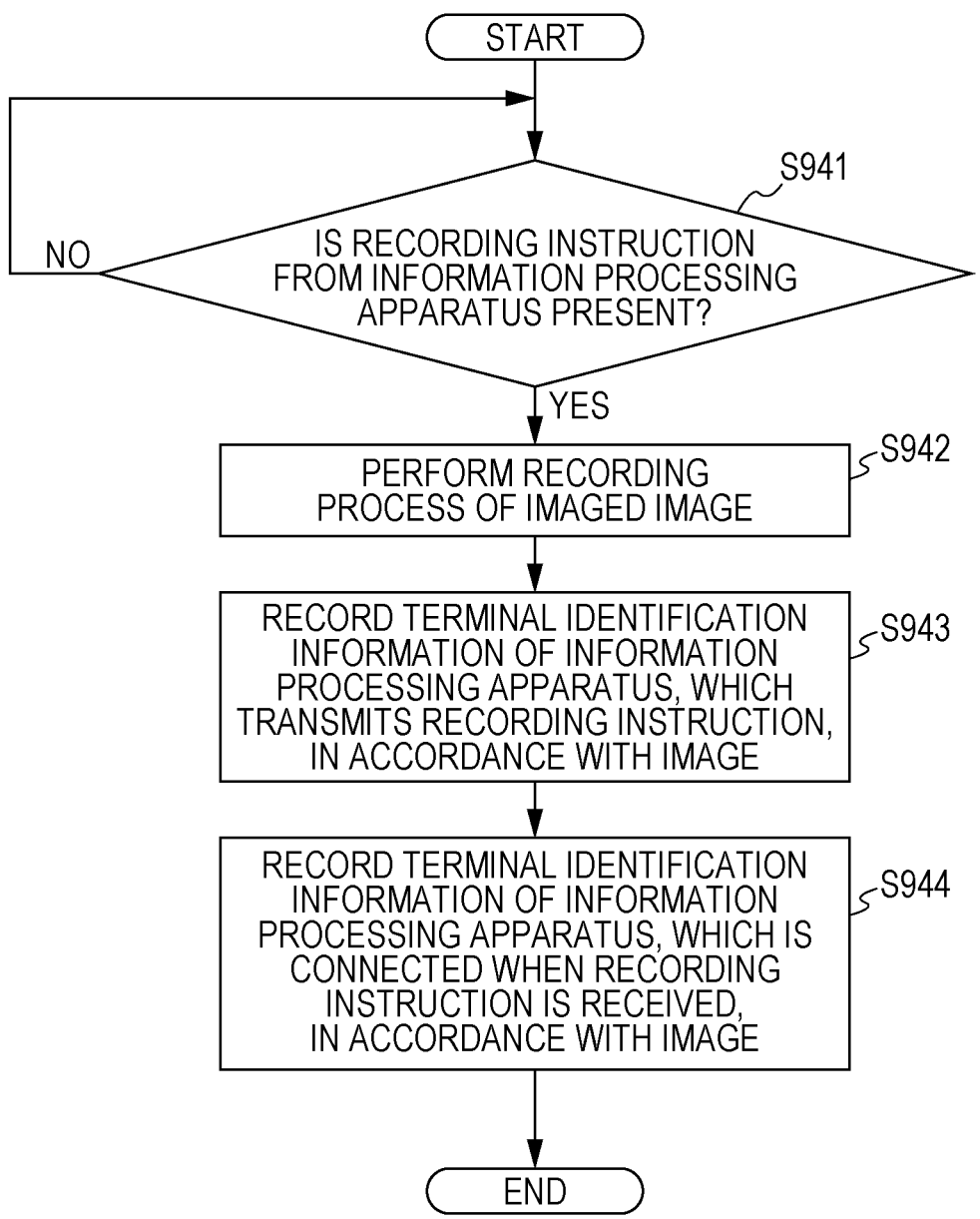

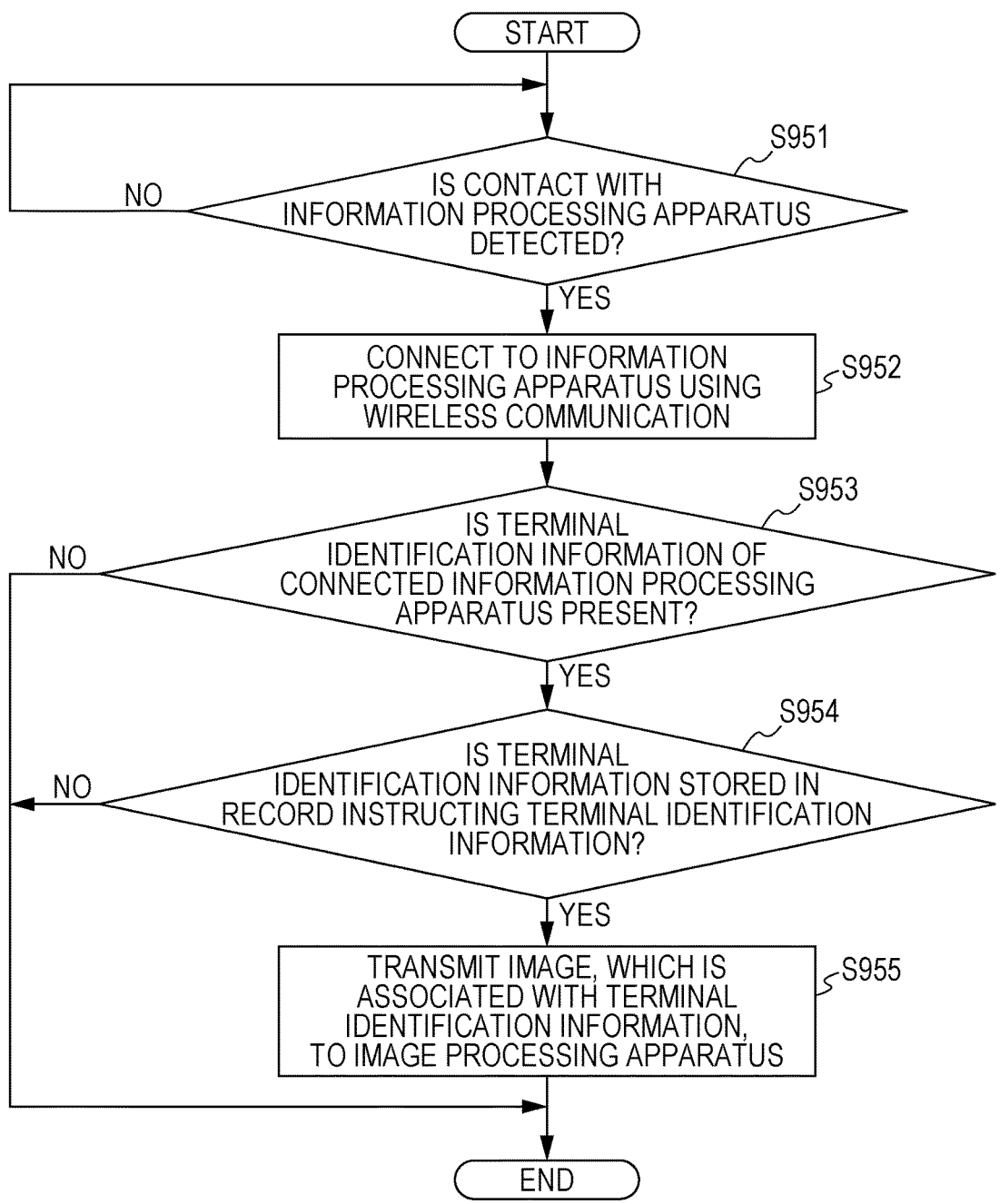

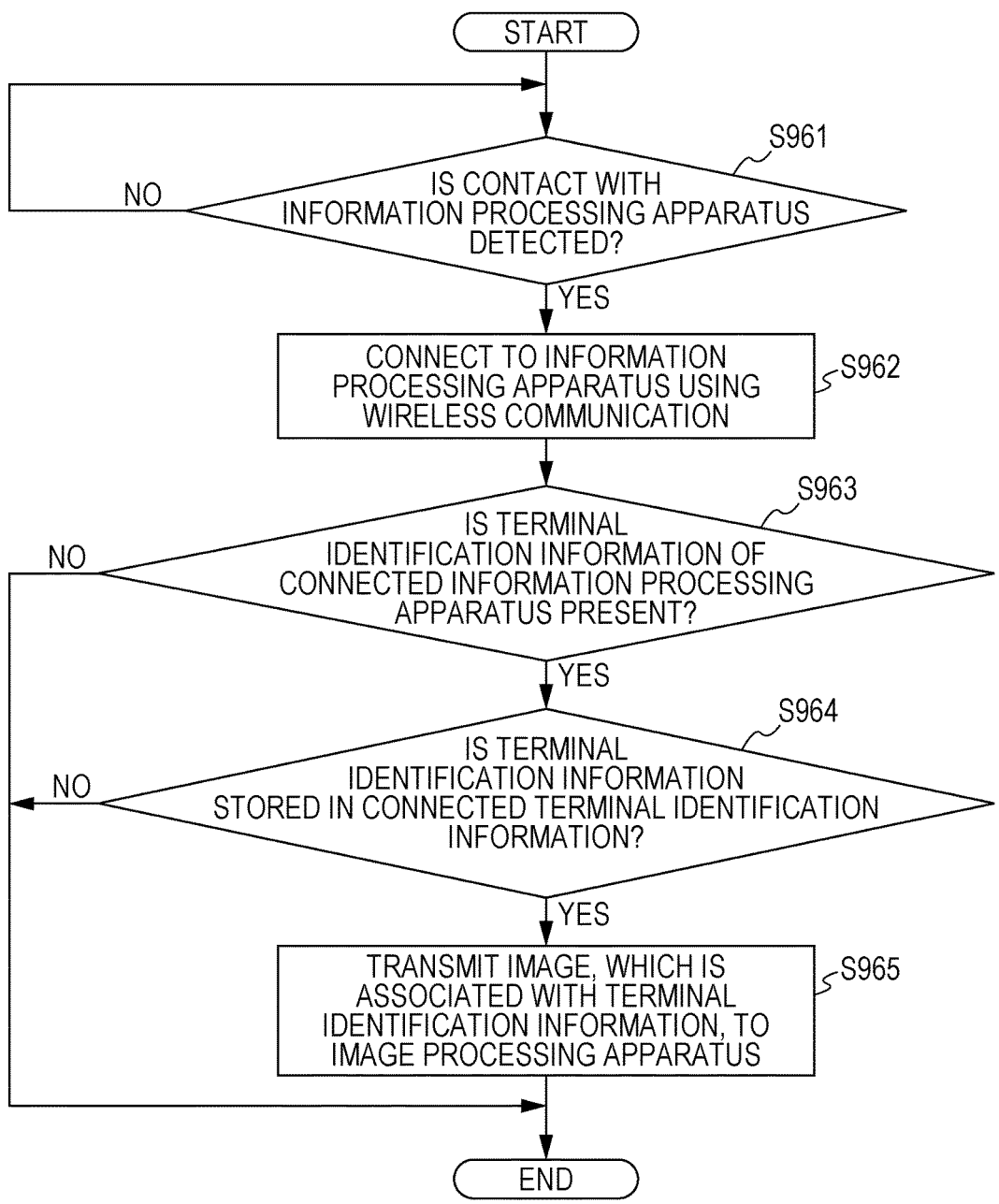

INFORMATION PROCESSING APPARATUS, METHOD, SYSTEM AND COMPUTER PROGRAM

TECHNICAL FIELD

The present disclosure relates to an information processing apparatus. More specifically, the present disclosure relates to an information processing apparatus which handles content generated by an imaging operation, an information processing system, a method for controlling the information processing apparatus, and a program causing a computer to perform the methods.

BACKGROUND ART

In related art, an imaging apparatus, such as a digital still camera or a digital video camera (for example, a camera-integrated recorder), which generates an image (image data) by imaging a subject and records the image as content, has become widespread. In addition, there is a wireless communication technology for exchanging a variety of data using wireless communication.

In addition, there is a technology for operating an imaging apparatus by another apparatus using wireless communication. For example, an electronic device has been proposed which causes an imaging apparatus to perform an operation corresponding to an operation switch image, on which a contact operation is performed, when the contact operation, performed on the operation switch image which is displayed on a display unit, is detected (for example, refer to PTL 1).

CITATION LIST

Patent Literature

PTL 1: JP2009-94591A

SUMMARY

Technical Problem

In the above-described related art technology, it is possible to operate the imaging apparatus by an electronic device using wireless communication. Therefore, for example, even when the imaging apparatus is separated from the electronic device, it is possible to operate the imaging apparatus using the electronic device.

Here, for example, a case is assumed in which an imaging operation is performed using an information processing apparatus capable of operating an imaging apparatus using wireless communication. In this case, it is possible to record an image (image content), which is generated by the imaging operation, in the imaging apparatus. In addition, when the image, which is recorded in the imaging apparatus, is used in the information processing apparatus, it is possible to transmit the image from the imaging apparatus to the information processing apparatus. As above, when the image is transmitted from the imaging apparatus to the information processing apparatus, it is necessary to appropriately perform image transmission.

It is desirable to appropriately perform image transmission between devices.

Solution to Problem

The embodiments explained below suggest how to transfer images using metadata.

In the first embodiment, an information processing apparatus has circuitry that transmit at least one content based on at least one metadata related to the content to a first external device in a case that the information processing apparatus is in proximity with the first external device.

The proximity of the first external device can be determined by various alternative wireless communication technologies that are used to connect the information processing apparatus and the first external device in a range of contact or approach.

Such wireless communication technologies include NFC, Bluetooth, infrared, or any other short-distance wireless communications.

An example of the information processing apparatus includes a lens-style camera and an action camera.

The content is generated and recorded with at least one metadata in a storage medium of the information processing apparatus based on an operation of the first external device.

The metadata include content identification information, a photographed date, terminal identification information, scene information, and individual facial information.

Also, the storage medium is detachably connected to the information processing apparatus.

The information processing apparatus further includes an imager, which captures at least one image. Based on the operation of the first external device, the image is captured and recorded with the metadata in the storage medium.

The first external device sends a recording request to the circuitry of the information processing apparatus, and in response to the recording request the at least one content is generated and recorded with the at least one metadata in the storage medium. The metadata includes terminal identification information to identify the first external device configured to send the recording request.

In another embodiment, the information processing apparatus is connected with a plurality of external devices including the first external device.

In order to distinguish one external device to another, terminal identification information is used as metadata. Specifically, the circuitry of the information processing apparatus transmit at least one content which is associated with the terminal identification information to identify the first external device in a case that the information processing apparatus is in proximity with the first external device.

The circuitry receives the terminal identification information in a case that the information processing apparatus is in proximity with the first external device and transmits the at least one content which is associated with the terminal identification information received by the circuitry.

Advantageous Effects of Invention

According to the embodiments of the present disclosure, there is an excellent advantage in that it is possible to appropriately perform content transmission between devices. Meanwhile, the advantage disclosed here is not necessarily limited, and may include any one of the advantages disclosed in the present disclosure.

BRIEF DESCRIPTION OF DRAWINGS

FIG. 6 is a diagram schematically illustrating an example of content of a content management file which is stored in a storage unit of the imaging apparatus according to the embodiment of the present disclosure.

FIG. 12 is a diagram schematically illustrating an example of content of an individual facial information management file which is stored in the storage unit of the imaging apparatus according to the embodiment of the present disclosure.

FIG. 16 is a diagram schematically illustrating an example of the content of a content management file which is stored in the storage unit of the imaging apparatus according to the embodiment of the present disclosure.

FIG. 17 is a flowchart illustrating an example of the process procedure of an image recording process performed by the imaging apparatus according to the embodiment of the present disclosure.

FIG. 18 is a flowchart illustrating an example of the process procedure of the image transmission process performed by the imaging apparatus according to the embodiment of the present disclosure.

FIG. 19 is a flowchart illustrating an example of the process procedure of the image transmission process performed by the imaging apparatus according to the embodiment of the present disclosure.

DESCRIPTION OF EMBODIMENTS

Hereinafter, modes for carrying out the present disclosure (hereinafter, referred to as embodiments) will be described. Description will be made in the following order.

1. Embodiment (example in which content stored in imaging apparatus is transmitted to information processing apparatus)

<1. First Embodiment>

"Example of External Configuration of Imaging Apparatus"

Figure 1A:
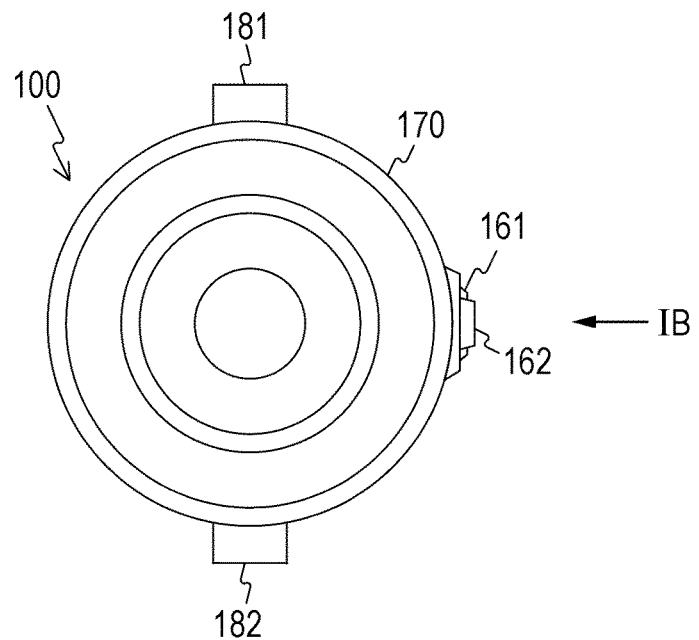
FIG. 1 is a diagram illustrating the external configuration of an imaging apparatus according to an embodiment of the present disclosure.
Figure 1B:
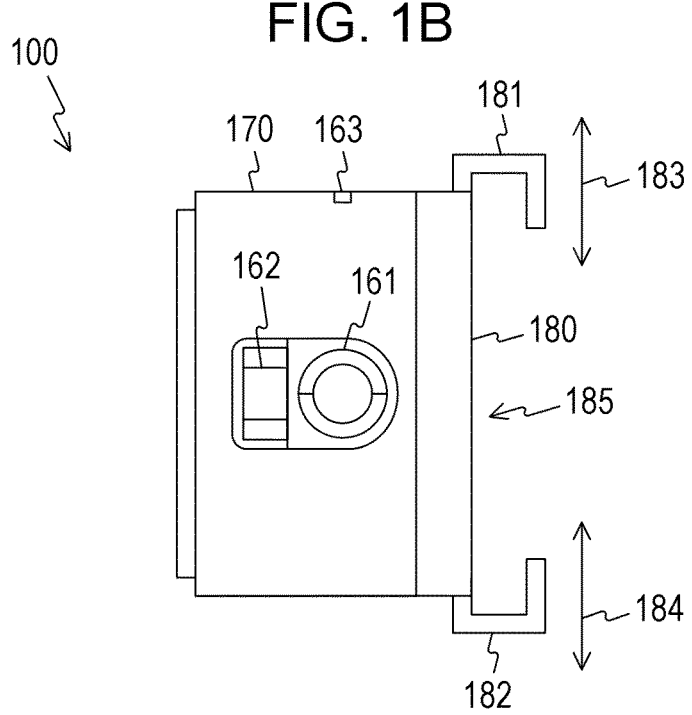

FIGS. 1A and 1B are diagrams illustrating the external configuration of an imaging apparatus 100 according to an embodiment of the present disclosure. In FIG. 1A is a front view illustrating the imaging apparatus 100 and FIG. 1B is a side view (side view when viewed from arrow IB) illustrating the imaging apparatus 100.

In addition, in the embodiment according to the present disclosure, an example in which the imaging apparatus 100 is a cylindrical (column-shaped) imaging apparatus (for example, a lens-style camera) is shown. That is, an example, in which the imaging apparatus 100 has a shape in which the lens part of a general imaging apparatus (for example, an integrated camera) is ejected, is shown. In addition, the imaging apparatus 100 is realized by, for example, a digital still camera or a digital video camera (for example, a camera-integrated recorder).

The imaging apparatus 100 includes operation members 161 to 163, and a lens-barrel 170. The lens-barrel 170 accommodates respective members such as an optical system and imaging system.

In addition, an adapter 180 is attached to the imaging apparatus 100. The adapter 180 is a mounting member (attachment) which includes mounting members 181 and 182 and which is detachable from the rear side surface (the opposite side surface of the lens side surface illustrated in FIG. 1A) of the imaging apparatus 100. Meanwhile, although FIGS. 1A and 1B illustrate an example in which the lens-barrel 170 and the adapter 180 are formed as different members, the lens-barrel 170 and the adapter 180 may be integrally formed.

The operation members 161 to 163 are operation members which are used when various operation inputs are performed. For example, the operation member 161 is an operation member (shutter button) which is used when a shutter operation (operation to record an image (image data) generated by an imaging unit 110 (illustrated in FIG. 3) as image content) of the imaging apparatus 100 is performed. In addition, the operation member 162 is an operation member (zoom lever) which is used when a zoom operation of the imaging apparatus 100 is performed. In addition, the operation member 163 is an operation member (power button) which is used when a power on/off operation of the imaging apparatus 100 is performed.

Figure 2A:
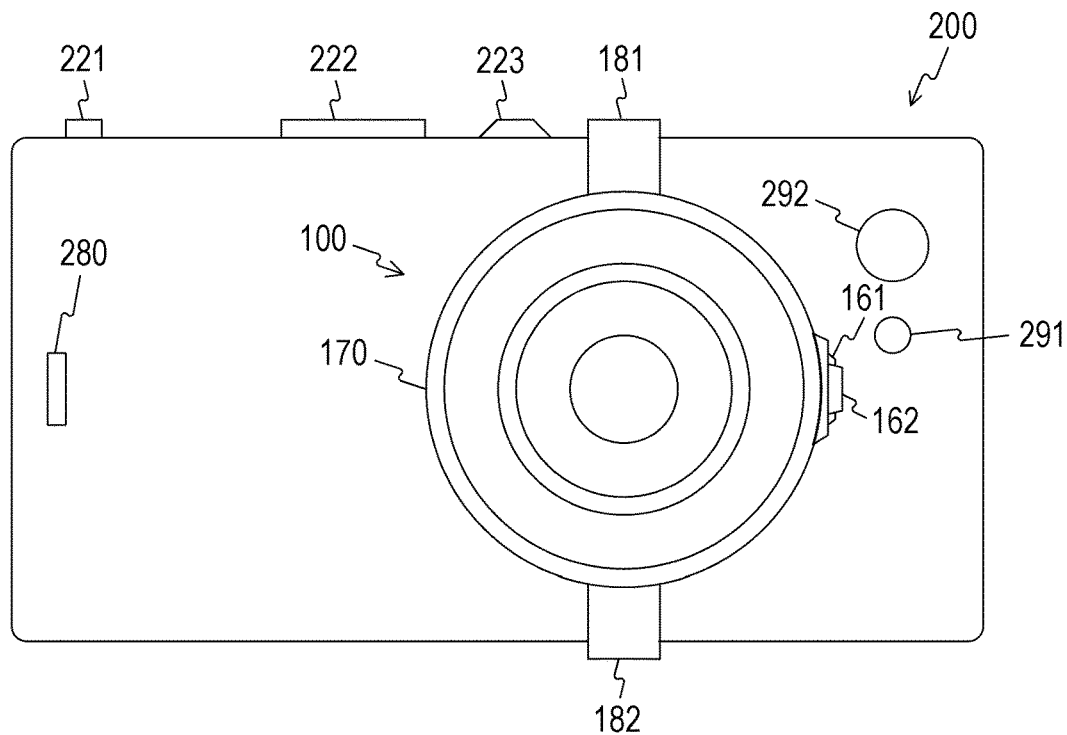
FIG. 2 is a diagram illustrating an external configuration acquired when the imaging apparatus is attached to an FIG. 3 is a block diagram illustrating an example of the functional configuration of the imaging apparatus and the information processing apparatus according to the embodiment of the present disclosure.
Figure 2B:
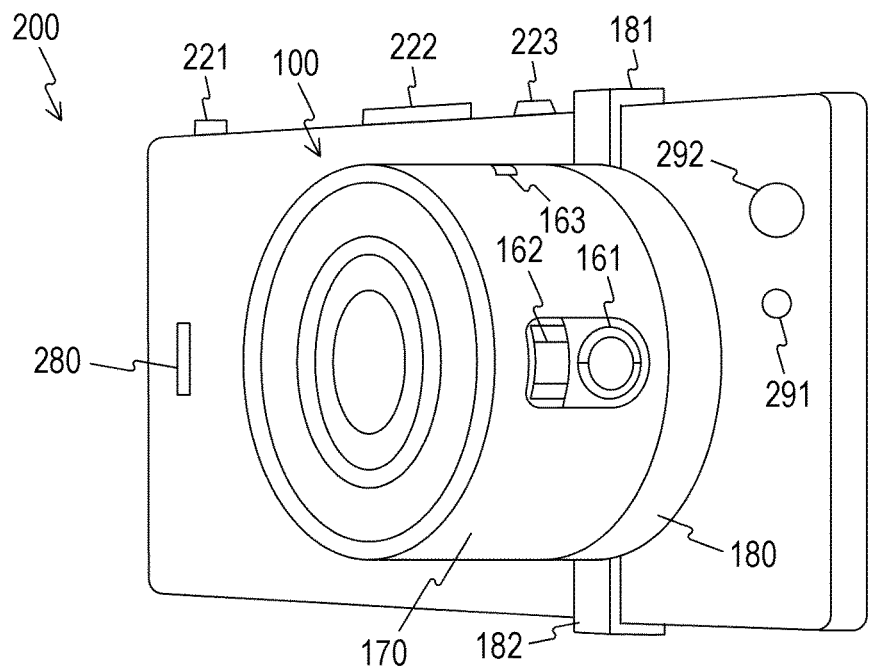

The mounting members 181 and 182 are holding members which are used when the imaging apparatus 100 is attached to another apparatus (for example, an information processing apparatus 200 illustrated in FIGS. 2A and 2B). For example, it is possible to attach the imaging apparatus 100 to another apparatus by moving the mounting member 181 in the direction of an arrow 183 and moving the mounting member 182 in the direction of an arrow 184 according to the shape and size of another apparatus. That is, the mounting members 181 and 182 are holding members for fixing the imaging apparatus 100 to another apparatus. In addition, an attachment surface when the imaging apparatus 100 is mounted on another apparatus is shown as a mounting surface 185 (the opposite side surface of the lens side surface illustrated in FIG. 1A). Meanwhile, FIGS. 2A and 2B illustrate an example in which the imaging apparatus 100 is attached to another apparatus.

As above, the imaging apparatus 100 can perform, for example, a normal imaging operation and can be used after being mounted on another apparatus (for example, a smart phone). In addition, when the imaging apparatus 100 is used after being mounted on another apparatus, it is possible to operate the imaging apparatus 100 by remote control using another apparatus.

"Example in which Imaging Apparatus is Attached"

FIGS. 2A and 2B are diagrams illustrating an external configuration when the imaging apparatus 100 is attached to the information processing apparatus 200 according to an embodiment of the present disclosure.

FIGS. 2A and 2B illustrate an example when the imaging apparatus 100 is attached to one surface (surface on which an imaging unit 292 is provided) of the information processing apparatus 200. FIG. 2A is a front view illustrating a case in which the imaging apparatus 100 is attached to the information processing apparatus 200. In addition, FIG. 2B is a perspective view illustrating the case in which the imaging apparatus 100 is attached to the information processing apparatus 200.

The information processing apparatus 200 includes operation members 221 to 223, an input/output unit 240 (illustrated in FIG. 3 and FIGS. 7A to 7C), an audio output unit 280, a light emitting unit 291, and an imaging unit 292. Meanwhile, the information processing apparatus 200 is realized by, for example, an information processing apparatus such as a smart phone, a tablet terminal, a notebook computer, or the like.

The operation members 221 to 223 are operation members which are used when various operation inputs are performed. For example, the operation member 221 is an operation member (shutter button) which is used when a shutter operation (operation to record an image (image data) generated by an imaging unit 292 as image content) of the information processing apparatus 200 is performed. In addition, the operation member 222 is an operation member (a volume adjusting button (volume lever)) which is used when an operation to adjust volume output from the audio output unit 280 is performed. In addition, the operation member 223 is an operation member (power button) which is used when a power on/off operation of the information processing apparatus 200 is performed.

The input/output unit 240 displays various images, and receives an operation input from a user based on a state in which an object which approaches or comes into contact with the display surface of the input/output unit 240 is detected.

The audio output unit 280 outputs various types of audio information.

The light emitting unit 291 is a light emitting device which emits light to a subject. The light emitting unit 291 is used, for example, when an imaging operation is performed using the information processing apparatus 200 in an environment in which it is difficult to expect sufficient brightness as at night, indoors, or the like.

The imaging unit 292 images a subject and generates an image (image data).

As illustrated in FIGS. 2A and 2B, it is possible to fix the imaging apparatus 100 to the information processing apparatus 200 by interposing the main body of the information processing apparatus 200 using the mounting members 181 and 182 of the adapter 180. Meanwhile, the imaging apparatus 100 may be attached to another part of the information processing apparatus 200 (a part other than parts illustrated in FIGS. 2A and 2B).

"Example of Functional Configuration of Imaging Apparatus and Information Processing Apparatus"

FIG. 3 is a block diagram illustrating an example of the functional configuration of the imaging apparatus 100 and the information processing apparatus 200 according to the embodiment of the present disclosure. Meanwhile, the imaging apparatus 100 is an example of an information processing apparatus of claims. In addition, the information processing apparatus 200 is an example of another information processing apparatus of claims. In addition, an information processing system, which includes the imaging apparatus 100 and the information processing apparatus 200, is an example of an information processing system of claims.

"Example of Functional Configuration of Imaging Apparatus"

The imaging apparatus 100 includes an imaging unit 110, an image processing unit 120, a storage unit 130, a control unit 140, a wireless communication unit 150, and an operation reception unit 160.

The imaging unit 110 images a subject and generates an image (image data) based on the control of the control unit 140, and outputs the generated image to the image processing unit 120. The imaging unit 110 includes, for example, an optical system (a plurality of lenses), and an imaging element. In addition, each of the units (for example, a zoom lens, a focusing lens, and an aperture) of the imaging unit 110 is controlled based on the control of the control unit 140. Meanwhile, in the embodiment according to the present disclosure, an "image" indicates both meanings of an image itself and content (image content (image data)) used to display the image.

The image processing unit 120 performs a prescribed image processing (for example, demosaic processing) on an image which is output from the imaging unit 110 based on the control of the control unit 140, and stores the image, on which the image processing is performed, in the storage unit 130. Meanwhile, the image, on which the image processing is performed by the image processing unit 120, may be transmitted to the information processing apparatus 200 using wireless communication and may be stored in a storage unit 270.

The storage unit 130 is a recording medium which stores the image, on which the image processing is performed by the image processing unit 120, as content (for example, still image file or moving image file). Meanwhile, the storage unit 130 may be embedded in the imaging apparatus 100 or may be detachable from the imaging apparatus 100.

The control unit 140 controls each of the units of the imaging apparatus 100 based on a control program. For example, the control unit 140 controls each of the units based on operation input received by the operation member (operation reception unit 160), such as the zoom lever or a shutter button which is provided in the imaging apparatus 100. In addition, the control unit 140 controls each of the units based on control information which is received from the information processing apparatus 200 through the wireless communication unit 150. That is, it is possible to control the imaging apparatus 100 using the information processing apparatus 200.

In addition, for example, the control unit 140 performs control such that an image, which is stored in the storage unit 130, is transmitted to the information processing apparatus 200 based on metadata related to the image (content) which is generated through the imaging operation using the information processing apparatus 200 and is stored in the storage unit 130. In addition, the control unit 140 performs a recording process such that the image, which is generated through the imaging operation performed by the imaging unit 110, is stored in the storage unit 130 based on a recording instruction from the information processing apparatus 200 which is connected by wireless communication. In this case, the control unit 140 associates identification information for identifying the information processing apparatus 200 with the image as metadata, and records the identification information.

In addition, for example, the control unit 140 extracts an image, which satisfies a transmission condition, from the storage unit 130 based on the metadata, and transmits the extracted image to the information processing apparatus 200. Here, it is possible to extract the image, which satisfies the transmission condition, from the storage unit 130 using, for example, at least one of data on which an image is generated, the attribute of a subject which is included in the image, and whether or not a person is included in the image, as the metadata. In addition, the transmission condition is a condition which is used as determination reference when an image, which is transmitted from the imaging apparatus 100 to the information processing apparatus 200, is extracted.

The wireless communication unit 150 transmits and receives each piece of information (for example, control data or image data) to and from another information processing apparatus (for example, information processing apparatus 200) using wireless communication based on the control of the control unit 140.

Here, it is possible to use, for example, a wireless Local Area Network (LAN) as wireless communication. It is possible to use, for example, Wireless Fidelity (Wi-Fi) as the wireless LAN. In addition, it is possible to use, for example, Bluetooth (registered trademark), Near Field Communication (NFC), infrared, radio waves for a mobile phone, and the like as wireless communication.

In addition, it is possible for the wireless communication unit 150 to use a plurality of wireless communication methods. For example, it is possible for the wireless communication unit 150 to include a short-distance wireless communication unit 151 and a long-distance wireless communication unit 152. Here, the short-distance wireless communication unit 151 is a wireless communication unit which is capable of performing wireless communication in a range of contact or approach. In addition, the long-distance wireless communication unit 152 is a wireless communication unit which performs wireless communication (long-distance wireless communication for a long distance) in a wider range than that of the short-distance wireless communication unit 151. Here, it is possible to use NFC, Bluetooth, or infrared as short-distance wireless communication. In addition, it is possible to use Bluetooth, Wi-Fi, or electronic waves for a mobile phone as long-distance wireless communication.

For example, when wireless communication starts, the short-distance wireless communication unit 151 causes power to be on through NFC and exchanges data (for example, Service Set Identifier (SSID)) related to Wi-Fi. Further, it is possible to perform subsequent exchange of data by the long-distance wireless communication unit 152 through Wi-Fi.

In addition, for example, when it is detected that the imaging apparatus 100 is mounted on, comes into contact with, or approaches the information processing apparatus 200, it is possible to use the exchange of data performed by the short-distance wireless communication unit 151 (for example, NFC). In addition, it is possible to perform the exchange of image data or control data between the imaging apparatus 100 and the information processing apparatus 200 using the long-distance wireless communication unit 152 (for example, Wi-Fi).

The operation reception unit 160 is an operation reception unit which receives an operation performed by the user, and outputs control information (operation information) according to the received operation content to the control unit 140. Meanwhile, the operation reception unit 160 corresponds to, for example, the operation members 161 to 163 illustrated in FIGS. 1A and 1B.

"Example of Functional Configuration of Information Processing Apparatus"

The information processing apparatus 200 includes a posture detection unit 210, an operation reception unit 220, a wireless communication unit 230, an input/output unit 240, a control unit 250, an image processing unit 260, a storage unit 270, and the audio output unit 280.

The posture detection unit 210 detects the posture of the information processing apparatus 200 by detecting the acceleration, motion, inclination or the like of the information processing apparatus 200, and outputs posture information related to the detected posture to the control unit 250. Meanwhile, it is possible to use, for example, various sensors, such as a gyro sensor and an acceleration sensor, as the posture detection unit 210.

The operation reception unit 220 is an operation reception unit which receives an operation performed by the user, and outputs control information (operation information) according to the received operation content to the control unit 250. Meanwhile, the operation reception unit 220 corresponds to, for example, the operation members 221 to 223 illustrated in FIGS. 2A and 2B.

The wireless communication unit 230 transmits or receives each piece of information (for example, control data or image data) to or from another information processing apparatus (for example, imaging apparatus 100) using wireless communication based on the control of the control unit 250. It is possible to use, for example, the above-described wireless LAN (for example, Wi-Fi), NFC, Bluetooth, infrared, electronic waves for a mobile phone or the like as wireless communication. In addition, a plurality of wireless communication methods may be used.

As above, it is possible for the wireless communication unit 230 to include a short-distance wireless communication unit 231 and a long-distance wireless communication unit 232. Meanwhile, the short-distance wireless communication unit 231 corresponds to the short-distance wireless communication unit 151 of the imaging apparatus 100, and the long-distance wireless communication unit 232 corresponds to the long-distance wireless communication unit 152 of the imaging apparatus 100.

The input/output unit 240 is configured in such a way that an input unit 241 and a display unit 242 are integrally formed. In addition, the input/output unit 240 displays various images on the display unit 242 based on the control of the control unit 250, and receives operation input from the user using the input unit 241 based on a state in which an object which approaches or comes into contact with the display surface of the display unit 242 is detected. In addition, the input unit 241 outputs the control information according to the received operation input to the control unit 250.

For example, it is possible to use an electrostatic type (electrostatic capacity type) touch panel, which detects the contact or approach of an object (for example, a finger of a person) which has conductivity, as the input unit 241. In addition, it is possible to use, for example, a display panel, such as a Liquid Crystal Display (LCD), or an organic Electro Luminescence (EL) panel, as the display unit 242. Further, the input/output unit 240 is formed by, for example, superimposing a transparent touch panel on the display surface of a display panel.

For example, when the user performs a contact operation (or approach operation) on an operation target or the like which is displayed on the display unit 242, the operation of the information processing apparatus 200 or the imaging apparatus 100 is possible. Here, the operation target is, for example, a shutter button or the like which is displayed on the input/output unit 240, and is an operation button (Graphical User Interface (GUI) button) for performing operation input.

The control unit 250 controls each of the units of the information processing apparatus 200 based on the control program. For example, the control unit 250 determines the posture of the information processing apparatus 200 based on the posture information from the posture detection unit 210, and switches the display state of a display screen which is displayed on the input/output unit 240 based on the result of determination. For example, the control unit 250 determines the vertical direction of the posture of the information processing apparatus 200 based on the posture information from the posture detection unit 210, and switches the vertical direction of the display state of the display screen which is displayed on the input/output unit 240 based on the result of determination.

In addition, for example, the control unit 250 performs control such that an image (content), which is transmitted from the imaging apparatus 100, is stored in the storage unit 270 and is displayed on the input/output unit 240.

The image processing unit 260 performs a prescribed image processing on an image, which is generated by the imaging apparatus 100, or an image, which is generated by the imaging unit 292 (illustrated in FIGS. 2A and 2B), based on the control of the control unit 250, and displays the image, on which the image processing is performed, on the display unit 242. In addition, the image processing unit 260 stores the image in the storage unit 270 based on the control of the control unit 250. In addition, the image processing unit 260 displays the display screen, which is used when the imaging operation using the imaging apparatus 100 is performed, on the display unit 242 based on the control of the control unit 250.

The storage unit 270 is a recording medium which stores each piece of information based on the control of the control unit 250. For example, in the storage unit 270, the image which is generated by the imaging apparatus 100 and the image which is generated by the imaging unit 292 (illustrated in FIGS. 2A and 2B) are stored as content (for example, still image file or moving image file). Meanwhile, the storage unit 270 may be embedded in the information processing apparatus 200 or may be detachable from the information processing apparatus 200.

The audio output unit 280 outputs audio information based on the control of the control unit 250. It is possible to realize the audio output unit 280 using, for example, a speaker.

"Example of Hardware Configuration of Imaging Apparatus"

Figure 4:
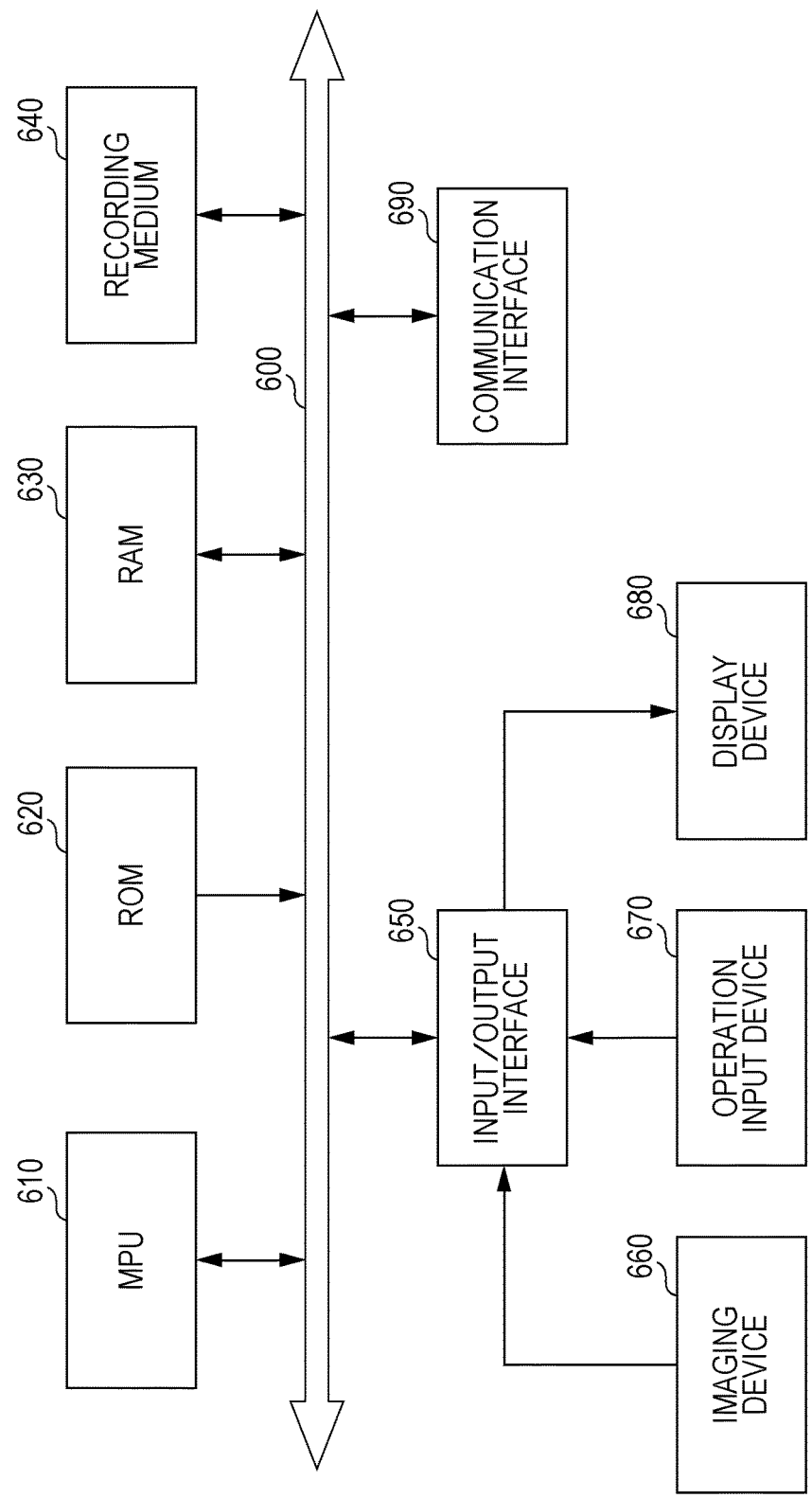
FIG. 4 is a diagram illustrating an example of the hardware configuration of the imaging apparatus according to a first embodiment of the present disclosure.

FIG. 4 is a diagram illustrating an example of the hardware configuration of the imaging apparatus 100 according to a first embodiment of the present disclosure.

The imaging apparatus 100 includes a Micro Processing Unit (MPU) 610, a Read Only Memory (ROM) 620, and a Random Access Memory (RAM) 630. In addition, the imaging apparatus 100 includes a recording medium 640, an input/output interface 650, an imaging device 660, an operation input device 670, a display device 680, and a communication interface 690. In addition, in the imaging apparatus 100, each of the components is connected through, for example, a bus 600 as a data transmission path.

The MPU 610 is formed by an integrated circuit or the like, in which the MPU or a plurality of circuits which realize various functions, such as an image process, are integrated. In addition, the MPU 610 functions as the control unit 140 (illustrated in FIG. 3) which controls the entire imaging apparatus 100. In addition, the MPU 610 functions as the image processing unit 120 (illustrated in FIG. 3) in the imaging apparatus 100.

The ROM 620 stores control data, such as a program or an operation parameter, which is used by the MPU 610. The RAM 630 temporarily stores, for example, a program which is executed by the MPU 610.

The recording medium 640 functions as the storage unit 130 (illustrated in FIG. 3), and stores, for example, various data (or database) such as process information, and applications. Here, it is possible to use, for example, a magnetic recording medium such as a hard disk as the recording medium 640. In addition, it is possible to use, for example, a non-volatile memory as the recording medium 640. The non-volatile memory is, for example, an Electrically Erasable and Programmable Read Only Memory (EEPROM) or a flash memory. In addition, the non-volatile memory is, for example, a Magneto-resistive Random Access Memory (MRAM). In addition, the non-volatile memory is, for example, a Ferroelectric Random Access Memory (FeRAM) or a Phase change Random Access Memory (PRAM). In addition, the imaging apparatus 100 may include the recording medium 640 which is detachable from the imaging apparatus 100.

The input/output interface 650 is connected to, for example, the imaging device 660, the operation input device 670, and the display device 680. It is possible to use, for example, a Universal Serial Bus (USB) terminal or a Digital Visual Interface (DVI) terminal as the input/output interface 650. In addition, it is possible to use, for example, a High-Definition Multimedia Interface (HDMI, registered trademark) terminal, various process circuits or the like as the input/output interface 650. Meanwhile, it is possible for the input/output interface 650 to be connected to an external device. The external device is, for example, an operation input device (for example, keyboard or mouse), a display device (for example, external display device), or an imaging device (for example, imaging apparatus) as the external device of the imaging apparatus 100.

The imaging device 660 is a device which functions as the imaging unit 110 (illustrated in FIG. 3). For example, as the imaging device 660, it is possible to use an imaging device which includes an optical system, an imaging element, and a signal processing circuit. In this case, the imaging apparatus 100 can process an imaged image which is generated by the device. Here, the optical system means, for example, the lens of the optical system. In addition, the imaging element is, for example, an imaging element such as a Charge Coupled Device (CCD), a Complementary Metal Oxide Semiconductor (CMOS) or the like. In addition, it is possible to form the optical system and the imaging element with the lens of the optical system and an image sensor using the above-described plurality of imaging elements. In addition, the signal processing circuit includes, for example, an Automatic Gain Control (AGC) circuit and an Analog to Digital Converter (ADC). Further, for example, the signal processing circuit converts an analog signal, which is generated by the imaging element, into a digital signal (image data), and performs various signal processes. As the signal process which is performed by the signal processing circuit, for example, a white balance correction process, an interpolation process, a tone correction process, a gamma correction process, a YCbCr conversion process, an edge enhancement process, a coding process, or the like may be provided.

The operation input device 670 is a device which functions as an operation reception unit 160 (illustrated in FIG. 3). For example, the operation input device 670 is provided on the imaging apparatus 100, and is connected to the input/output interface 650 on the inside of the imaging apparatus 100. In addition, for example, as the operation input device 670, it is possible to use buttons, arrow keys, a rotary selector such as a jog dial, or a combination thereof.

The display device 680 is a device which functions as a display unit (not shown in the drawing). For example, the display device 680 is provided on the imaging apparatus 100, and is connected to the input/output interface 650 on the inside of the imaging apparatus 100. Meanwhile, the imaging apparatus 100 is provided with a simple device as the display device 680. Therefore, it is difficult to display the image or the like, which is generated by the imaging unit 110, on the display device 680 which is provided in the imaging apparatus 100. In addition, the display device 680 may include, for example, a device (for example, touch screen) capable of performing display and a user operation.

The communication interface 690 is a communication section included in the imaging apparatus 100, and functions as the wireless communication unit 150 (illustrated in FIG. 3) for performing wireless communication with the information processing apparatus 200 or an external device (for example, server (not shown in the drawing)) through a network (or directly). Here, as the communication interface 690, it is possible to use, for example, a communication antenna or a Radio Frequency (RF) circuit (wireless communication). In addition, as the communication interface 690, it is possible to use, for example, an Institute of Electrical and Electronic Engineers (IEEE) 802.15.1 port or a transmission/reception circuit (wireless communication). In addition, as the communication interface 690, it is possible to use, for example, an IEEE802.11b port and a transmission/reception circuit (wireless communication), a LAN terminal, and a transmission/reception circuit (wired communication).

Meanwhile, the hardware configuration of the imaging apparatus 100 illustrated in FIG. 4 is an example, and the hardware configuration of the imaging apparatus 100 is not limited thereto.

For example, the imaging apparatus 100 may include a device which functions as the audio output unit. The device is, for example, an audio output device 754 illustrated in FIG. 5.

In addition, the imaging apparatus 100 may not include, for example, the operation input device 670 and the display device 680.

"Example of Hardware Configuration of Information Processing Apparatus"

Figure 5:
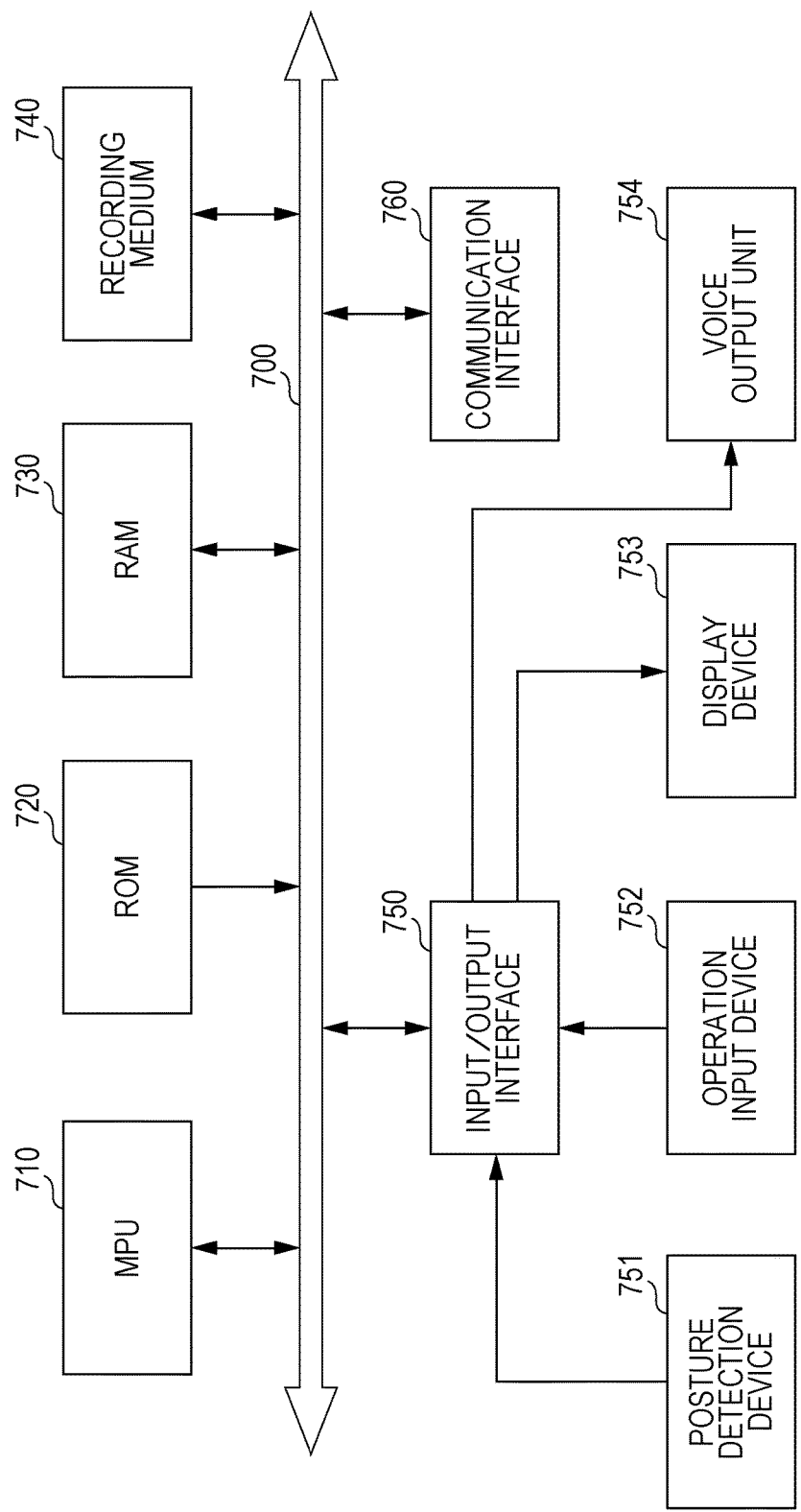
FIG. 5 is a diagram illustrating examples of the hardware configuration of the imaging apparatus and the information processing apparatus according to the first embodiment of the present disclosure.

FIG. 5 is a diagram illustrating an example of the hardware configuration of the information processing apparatus 200 according to the first embodiment of the present disclosure.

The information processing apparatus 200 includes an MPU 710, a ROM 720, a RAM 730, and a recording medium 740. In addition, the information processing apparatus 200 includes an input/output interface 750, a posture detection device 751, an operation input device 752, a display device 753, an audio output device 754, and a communication interface 760. In addition, in the information processing apparatus 200, respective components are connected through, for example, a bus 700 as a data transmission path.

Here, the MPU 710, the ROM 720, the RAM 730, the recording medium 740, the input/output interface 750, the operation input device 752, the display device 753, and the communication interface 760 correspond to the respective units having the same names in the imaging apparatus 100 illustrated in FIG. 4. Therefore, here, description will be made based on differences from the respective units illustrated in FIG. 4, and detailed description of the respective units will not be repeated. Meanwhile, as the display device 753, it is possible to use a Liquid Crystal Display (LCD). In addition, as the display device 753, it is possible to use an organic Electro-Luminescence (EL) display and an Organic Light Emitting Diode (OLED) display.

The MPU 710 functions as the control unit 250 (illustrated in FIG. 3) which controls the entire information processing apparatus 200. In addition, the MPU 710 functions as the image processing unit 120 (illustrated in FIG. 3) in the information processing apparatus 200.

The recording medium 740 functions as the storage unit 270 (illustrated in FIG. 3).

The input/output interface 750 is connected to, for example, the posture detection device 751, the operation input device 752, the display device 753, and the audio output device 754.

The posture detection device 751 is a device which functions as the posture detection unit 210 (illustrated in FIG. 3). For example, as the posture detection device 751, it is possible to use various sensors such as a gyro sensor and an acceleration sensor.

The audio output device 754 is a device which functions as the audio output unit 280 (illustrated in FIG. 3). The device is, for example, an audio output device which includes a Digital Signal Processor (DSP), an amplifier (AMP), and a speaker. In this case, the information processing apparatus 200 can perform, for example, mute of audio or volume adjustment as a process corresponding to the prescribed user operation.

Meanwhile, the hardware configuration of the information processing apparatus 200 illustrated in FIG. 5 is an example, and the hardware configuration of the information processing apparatus 200 is not limited thereto.

"Example of Content of Content Management File"

FIG. 6 is a diagram schematically illustrating an example of the content of a content management file 300 which is stored in the storage unit 130 of the imaging apparatus 100 according to the embodiment of the present disclosure.

Content identification information 301, a photographed date 302, terminal identification information 303, scene information 304, and individual facial information 305 are associated with each other and stored in the content management file 300.

The content identification information 301 is information for identifying content and, for example, a serial number according to order, in which the recording process is performed, is recorded as content identification information.

The photographed date 302 is a date on which the content is photographed.

The terminal identification information 303 is information for identifying a terminal (information processing apparatus) which is connected to the imaging apparatus 100 when a content recording process is performed. For example, it is possible to use a Service Set Identifier (SSID), which is used when wireless communication is performed, as the terminal identification information. In addition, when NFC is used as wireless communication, NFC tag information may be used as terminal identification information.

For example, from among information processing apparatuses which are connected to the imaging apparatus 100 using wireless communication, the terminal identification information of an information processing apparatus which performs an image recording instruction (for example, operation to press a shutter button) is stored in the terminal identification information 303.

In addition, for example, the pieces of terminal identification information of both the information processing apparatus which is connected to the imaging apparatus 100 using wireless communication and the information processing apparatus which performs the image recording instruction may be stored in the terminal identification information 303. The example is illustrated in FIG. 16.

The scene information 304 is information related to the scene (or attribute) of a subject which is included in content. For example, a "facial picture" is stored in a case of still image content in which one person is included, a "group picture" is stored in a case of a still image content in which a plurality of people are included, and a "landscape" is stored in a case of a still image content in which landscape is included without a person. In addition, as another scene, for example, it is possible to store information related to a scene, such as an apparent party or an apparent mountain, as the scene information. Meanwhile, with regard to the scene information, the scene of content may be automatically determined and stored using an image recognition technology, and may be stored based on a user operation.

The individual facial information 305 is information related to the face of a person included in content. For example, with regard to the face of a person included in content, it is possible to identify each individual using an image recognition technology (for example, an individual identification technology) capable of identifying an individual. Meanwhile, with regard to the individual facial information, each individual may be automatically identified and stored using the image recognition technology, and may be stored based on the user operation.

Meanwhile, each piece of information is an example. A part of the information may be stored as the metadata of content, and another piece of information related to the content may be stored as the metadata of content. Another piece of information related to the content is, for example, individual attribute information (for example, gender or age) or positional information (for example, latitude, longitude, or height) acquired when photographing is performed.

In addition, in the embodiment according to the present disclosure, the example in which the metadata of content is managed after being recorded in the content management file is illustrated. However, the metadata of content may be managed using another piece of management information. In addition, for example, the metadata of content may be managed after being recorded in the content. For example, when an Exchangeable Image File Format (Exif) is used as an image file format, it is possible to manage the metadata of content by recording at least a part of each piece of information illustrated in FIG. 6 in a makernote.

"Usage Example of Imaging Apparatus and Information Processing Apparatus"

Figure 7A:
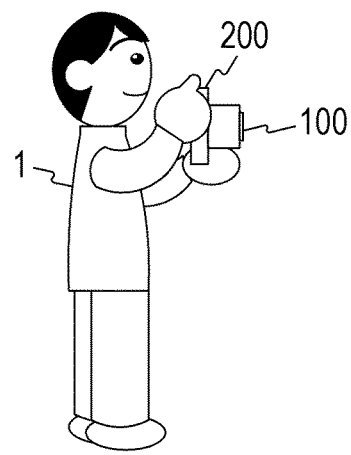
FIG. 7 is a diagram illustrating an example in which the imaging apparatus and the information processing apparatus according to the embodiment of the present disclosure are used.
Figure 7B:
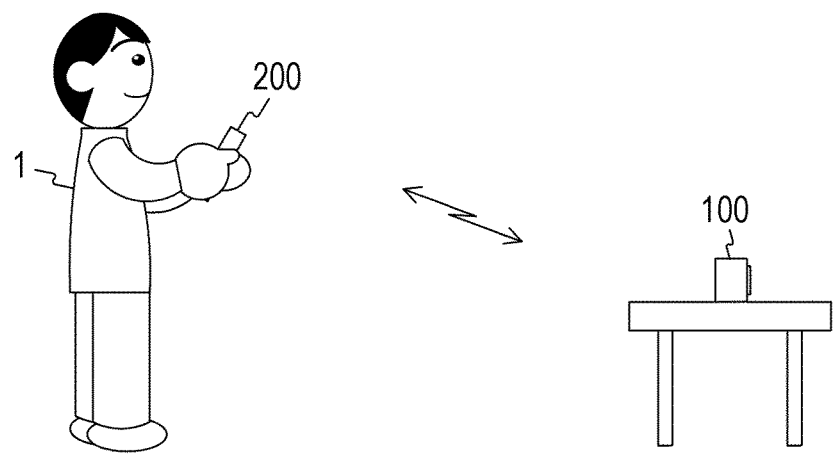
Figure 7C:
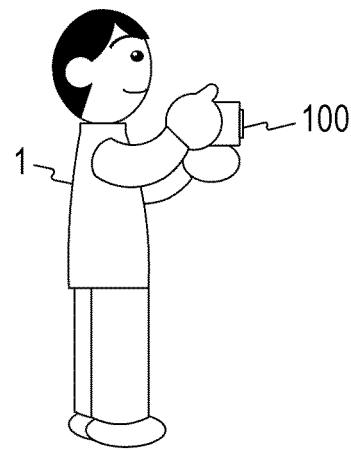

FIGS. 7A to 7C are diagrams illustrating examples in which the imaging apparatus 100 and the information processing apparatus 200 according to the embodiment of the present disclosure are used.

FIG. 7A illustrates an example of a case in which the imaging apparatus 100 is used after being mounted on the information processing apparatus 200. For example, as illustrated in FIGS. 2A and 2B, it is possible to mount the imaging apparatus 100 on one surface (the opposite side surface of the surface on which the input/output unit 240 is provided) of the information processing apparatus 200. In this case, a user 1 can perform photographing using the information processing apparatus 200, on which the imaging apparatus 100 is mounted, similarly to photographing using a general imaging apparatus (for example, a built-in camera).

FIG. 7B illustrates an example of a case in which the imaging apparatus 100 is used without being mounted on the information processing apparatus 200. For example, as illustrated in FIG. 7B, it is possible to install the imaging apparatus 100 in a place separated from the information processing apparatus 200. In this case, since the user 1 can remotely operate the imaging apparatus 100 using the information processing apparatus 200, it is possible to perform photographing using the imaging apparatus 100 and the information processing apparatus 200.

FIG. 7C illustrates an example of a case in which the imaging apparatus 100 is used without using the information processing apparatus 200. In this case, the user 1 can perform photographing using the operation member of the imaging apparatus 100. However, the imaging apparatus 100 does not include a display unit for displaying an image generated by the imaging unit 110. Therefore, when the imaging apparatus 100 is used without using the information processing apparatus 200, it is difficult for the user 1 to immediately check the photographed image.

In addition, the imaging apparatus 100 does not include a display unit for displaying an image stored in the storage unit 130. Therefore, for example, there is a problem in that it is difficult for the user 1 to easily select an image to be transmitted from the imaging apparatus 100 to the information processing apparatus 200 in the imaging apparatus 100.

Here, in the embodiment according to the present disclosure, an example, in which an image desired for the user is automatically transmitted from the imaging apparatus 100 to the information processing apparatus 200 at a timing that the contact or approach of the imaging apparatus 100 and the information processing apparatus 200 is detected, is shown.

"Example in which Image is Transmitted from Imaging Apparatus to Information Processing Apparatus"

Figure 8:
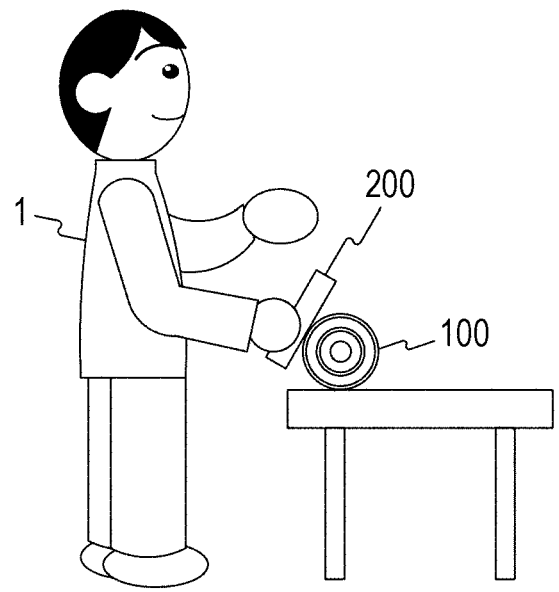
FIG. 8 is a diagram illustrating an example of a user operation performed when an image is transmitted from the imaging apparatus to the information processing apparatus according to the embodiment of the present disclosure.

FIG. 8 is a diagram illustrating an example of the user operation performed when an image is transmitted from the imaging apparatus 100 to the information processing apparatus 200 according to the embodiment of the present disclosure. In addition, in the embodiment according to the present disclosure, an example, in which connection between the imaging apparatus 100 and the information processing apparatus 200 starts when the information processing apparatus 200 comes into contact with (or approaches) the imaging apparatus 100, is shown.

For example, in NFC, regular communication is performed between devices. For example, a Polling Command is regularly issued from the information processing apparatus 200. The Polling Command is a command for determining an NFC tag which is set using an NFC standard (for example, refer to NFC Forum Type3 Tag Operation Specification NFC Forum-TS-Type-3-Tag_1.1).

For example, when the imaging apparatus 100 receives a Polling Command which is issued from the information processing apparatus 200, the imaging apparatus 100 transmits a response for the Polling Command (Polling Response) to the information processing apparatus 200. Meanwhile, a distance, in which data communication using NFC is possible, is approximately 1 cm to 10 cm. Therefore, when data communication using NFC is performed, it is necessary to cause the information processing apparatus 200 to come into contact with (or approach) a prescribed position of the imaging apparatus 100.

For example, when the contact between the imaging apparatus 100 and the information processing apparatus 200 is detected through NFC, Wi-Fi pairing is performed between the imaging apparatus 100 and the information processing apparatus 200, and thus Wi-Fi connection starts between the imaging apparatus 100 and the information processing apparatus 200.

For example, when an image, which is stored in the storage unit 130 of the imaging apparatus 100, is transmitted to the information processing apparatus 200 using wireless communication, the user 1 causes the information processing apparatus 200 to come into contact with the prescribed position of the imaging apparatus 100.

As above, when the information processing apparatus 200 is caused to come into contact with the prescribed position of the imaging apparatus 100, the contact is detected through NFC. Further. Wi-Fi pairing is performed between the imaging apparatus 100 and the information processing apparatus 200, and thus Wi-Fi connection starts between the imaging apparatus 100 and the information processing apparatus 200.

Meanwhile, in the example, an example, in which a Polling Command is issued from the information processing apparatus 200 and the contact or approach of the imaging apparatus 100 is detected in the information processing apparatus 200, is shown. However, a Polling Command may be issued from the imaging apparatus 100, and the contact or approach of the information processing apparatus 200 may be detected in the imaging apparatus 100. In addition, a device which issues a Polling Command may be different from a device which detects the contact or approach of another apparatus. In this case, information, such as a result of detection between the devices, is exchanged as necessary.

Meanwhile, in the example, an example, in which Wi-Fi connection starts between respective devices when the contact or approach of another imaging apparatus is detected through NFC, is shown. However, if it is possible to start Wi-Fi connection between respective devices using the contact or approach of another imaging apparatus as a trigger, another contact detection method or another approach detection method may be used.

As above, when the imaging apparatus 100 and the information processing apparatus 200 are connected by wireless communication, an image is transmitted from the imaging apparatus 100 to the information processing apparatus 200 based on a preset transmission condition. Here, the transmission condition is a condition used as determination reference when an image to be transmitted from the imaging apparatus 100 to the information processing apparatus 200 is extracted, and may be set by, for example, the imaging apparatus 100, or the user operation in the information processing apparatus 200 through wireless communication.

For example, a case is assumed in which the preset transmission condition is a condition that an image which is photographed at the same date as the contacted date is transmitted. In this case, the control unit 140 of the imaging apparatus 100 extracts an image, which is photographed on the same date as a date in which the information processing apparatus 200 comes into contact, based on the photographed date 302 of the content management file 300. Further, the control unit 140 reads the extracted image from the storage unit 130 and transmits the image to information processing apparatus 200.

In addition, a case is assumed in which, for example, the preset transmission condition is a condition that an image of a specified scene (for example, scene including the face of a person) is transmitted. In this case, the control unit 140 of the imaging apparatus 100 extracts an image of the specified scene based on the scene information 304 of the content management file 300. Further, the control unit 140 reads the extracted image from the storage unit 130 and transmits the image to the information processing apparatus 200. For example, an example in which the image of the scene including the face of a person is transmitted is illustrated in FIG. 9.

Figure 9:
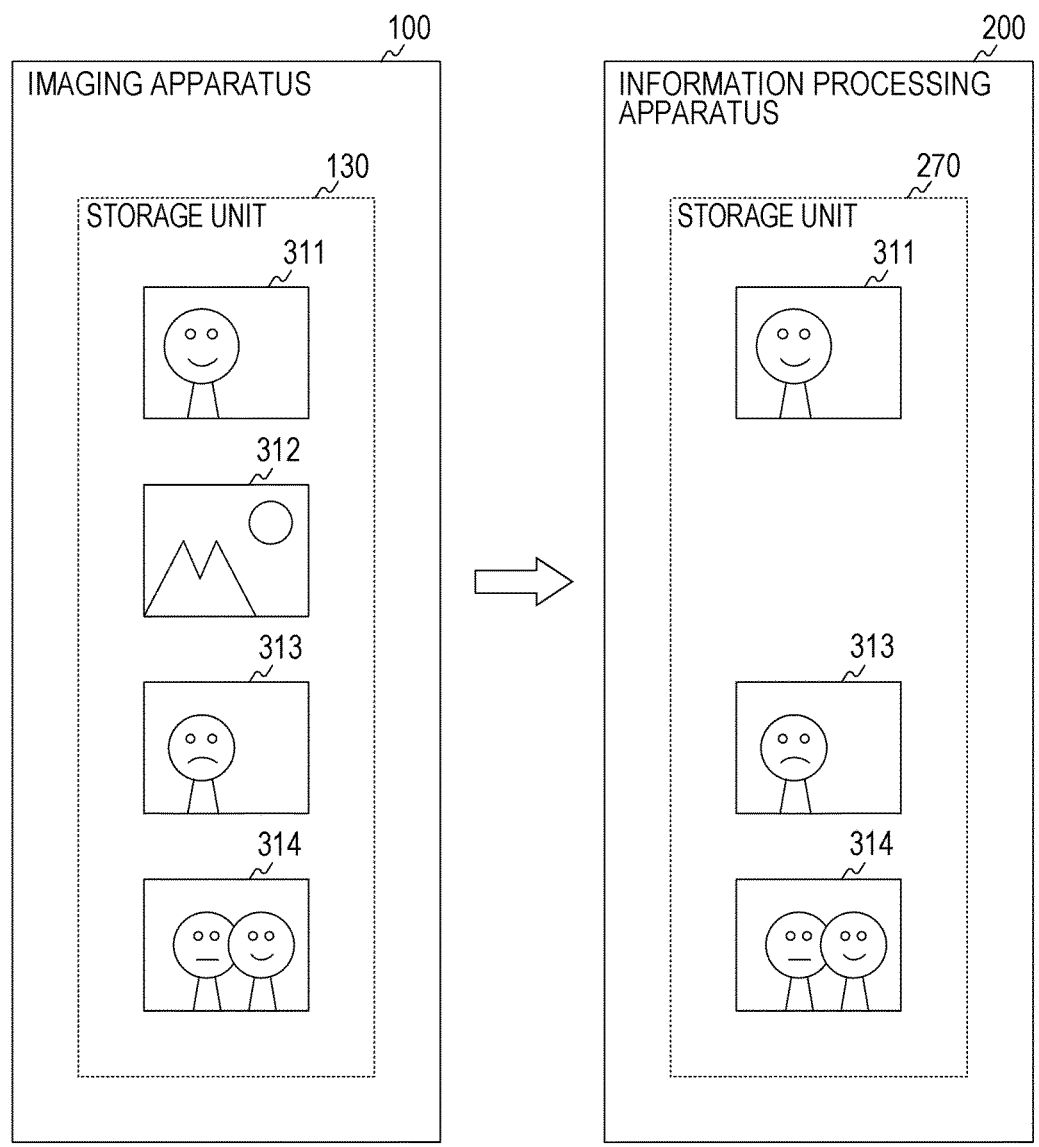
FIG. 9 is a diagram illustrating an example of the image which is transmitted from the imaging apparatus to the information processing apparatus according to the embodiment of the present disclosure.

FIG. 9 is a diagram illustrating an example of an image which is transmitted from the imaging apparatus 100 to the information processing apparatus 200 according to the embodiment of the present disclosure. FIG. 9 illustrates an example of a case in which a transmission condition for transmitting an image of a specified scene is set. In addition, FIG. 9 illustrates an example of a case in which the scene including the face of a person is set to a specified scene.

As illustrated in FIG. 9, from among images 311 to 314 which are stored in the storage unit 130 of the imaging apparatus 100, the images 311, 313, and 314 including the face of a person is transmitted to the information processing apparatus 200. Further, when the control unit 250 of the information processing apparatus 200 receives the images 311, 313, and 314, the control unit 250 stores the images 311, 313, and 314 in the storage unit 270, and displays the images 311, 313, and 314 on the input/output unit 240. Therefore, the user 1 can easily check the images 311, 313, and 314 which are received from the imaging apparatus 100.

"Example of Operation of Imaging Apparatus"

Figure 10:
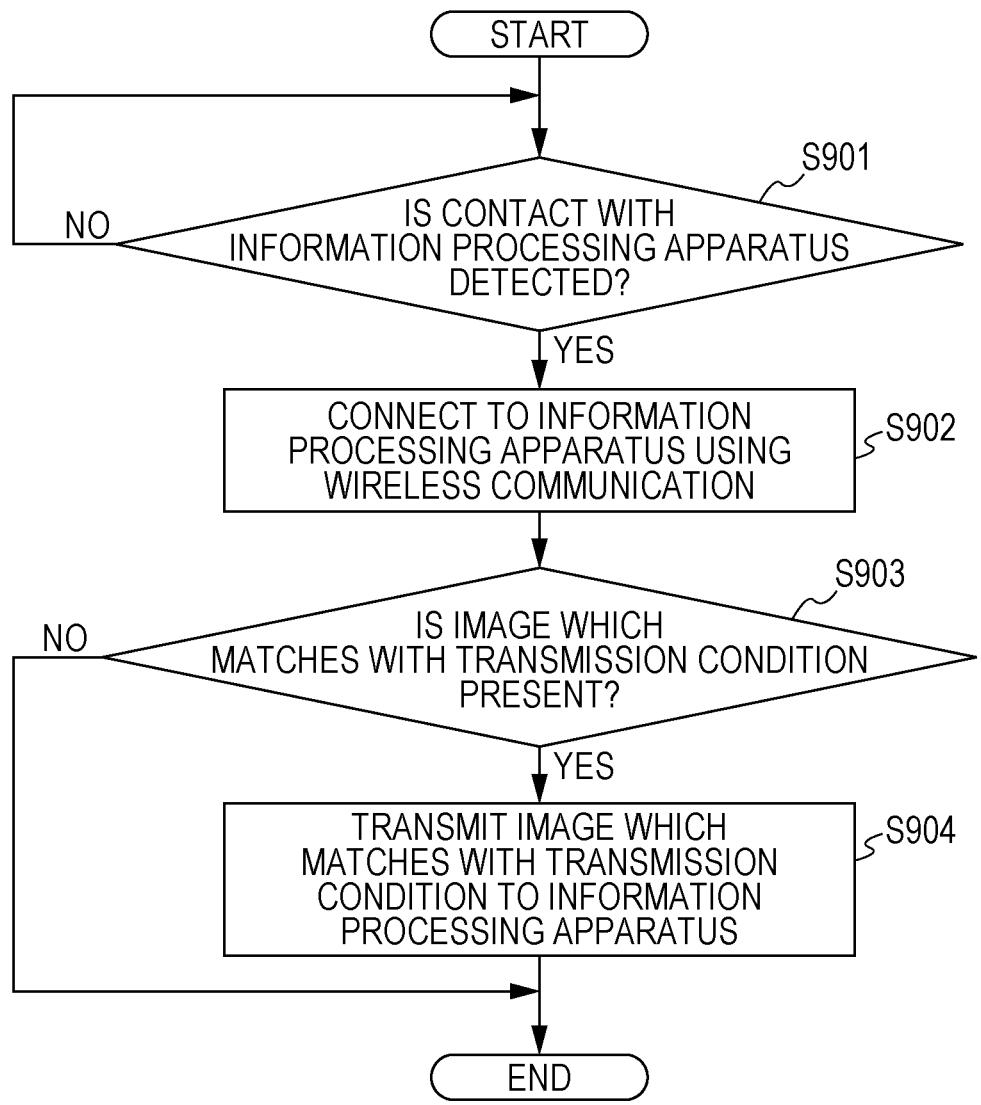
FIG. 10 is a flowchart illustrating an example of the process procedure of an image transmission process performed by the imaging apparatus according to the embodiment of the present disclosure.

FIG. 10 is a flowchart illustrating an example of the process procedure of an image transmission process performed by the imaging apparatus 100 according to the embodiment of the present disclosure. FIG. 10 illustrates an example in which an image which matches the transmission condition is transmitted to the information processing apparatus. In addition, FIG. 10 illustrates an example in which an image transmission mode is set up in the imaging apparatus 100.

Initially, the control unit 140 determines whether or not the contact (or approach) of the information processing apparatus is detected (step S901). When the contact of the information processing apparatus is not detected (step S901), monitoring is continued. Meanwhile, the imaging apparatus 100 may not detect the contact (or approach). Instead, the information processing apparatus 200 may detect the contact (or approach) of the imaging apparatus 100 and may transmit the result of detection to the imaging apparatus 100. In this case, the control unit 140 determines whether or not the contact (or approach) of the information processing apparatus 200 is detected based on the result of detection from the information processing apparatus 200 (step S901).

In addition, when the contact of the information processing apparatus is detected (step S901), the control unit 140 starts to connect the information processing apparatus using wireless communication (for example, Wi-Fi) (step S902).

Subsequently, the control unit 140 determines whether or not an image (image content), which matches the preset transmission condition, is stored in the storage unit 130 (step S903). For example, the control unit 140 determines whether or not the image, which matches the preset transmission condition, is stored in the storage unit 130 based on each piece of information which is stored in the content management file 300 illustrated in FIG. 6.

When the image, which matches the preset transmission condition, is not stored in the storage unit 130 (step S903), an image to be transmitted is not present, and thus the operation of the image transmission process ends. In this case, the point that an image to be transmitted is not present may be transmitted to the information processing apparatus, and the point may be displayed on the input/output unit of the information processing apparatus. Therefore, the user can grasp that an image to be transmitted to the imaging apparatus 100 is not present. In this case, a message to promote change in the transmission condition may be displayed, together with a point that an image to be transmitted to the imaging apparatus 100 is not present. Further, after the user of the information processing apparatus changes the transmission condition, the image transmission process may be performed again.

When the image, which matches the preset transmission condition, is stored in the storage unit 130 (step S903), the control unit 140 reads the image, which matches the transmission condition, from the storage unit 130, and transmits the image to the connected information processing apparatus (step S904). Meanwhile, step S904 is an example of a transmission procedure of claims.

"Example of Operation of Information Processing Apparatus"

Figure 11:
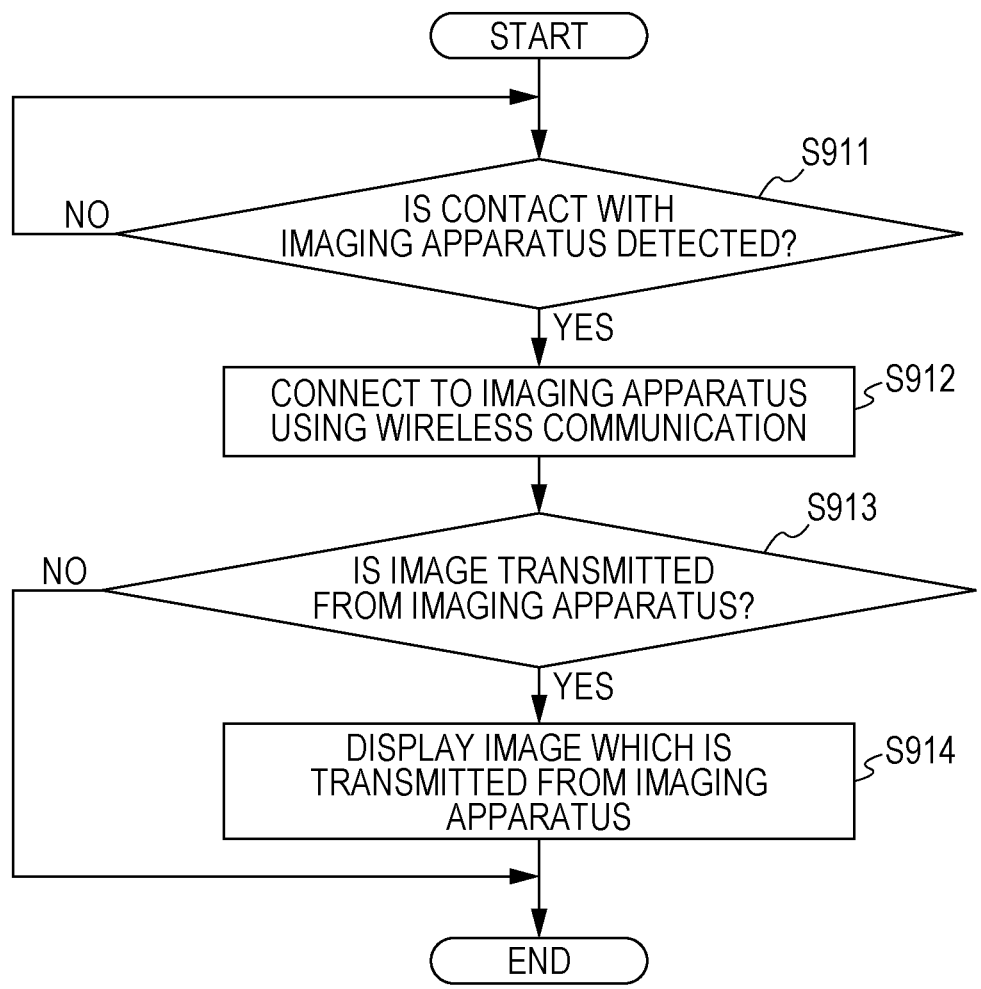
FIG. 11 is a flowchart illustrating an example of the process procedure of an image reception process performed by the information processing apparatus according to the embodiment of the present disclosure.

FIG. 11 is a flowchart illustrating an example of the process procedure of an image reception process performed by the information processing apparatus 200 according to the embodiment of the present disclosure. FIG. 11 illustrates an example of a case in which an image reception mode is set up in the information processing apparatus 200.

Initially, the control unit 250 determines whether or not the contact (or approach) of the imaging apparatus is detected (step S911). When the contact of the imaging apparatus is not detected (step S911), monitoring is continued. Meanwhile, the information processing apparatus 200 may not detect the contact (or approach). Instead, the imaging apparatus 100 may detect the contact (or approach) of the information processing apparatus 200 and may transmit the result of detection to the information processing apparatus 200. In this case, the control unit 250 determines whether or not the contact (or approach) of the imaging apparatus 100 is detected based on the result of the detection from the imaging apparatus 100 (step S911).

In addition, when the contact of the imaging apparatus is detected (step S911), the control unit 250 starts to connect the imaging apparatus using wireless communication (for example, Wi-Fi) (step S912).

Subsequently, the control unit 250 determines whether or not an image (image content) is transmitted from the connected imaging apparatus (step S903). For example, when an image is not transmitted from the imaging apparatus even though a prescribed time elapses (step S913), the operation of the image reception process ends.

When an image is transmitted from the imaging apparatus (step S913), the control unit 250 stores the image transmitted from the imaging apparatus in the storage unit 270, and displays the image on the input/output unit 240 (step S914).

Here, it is assumed that there is a user who wants to acquire an image, which is photographed by the user, from among images which are stored in the storage unit 130 of the imaging apparatus 100. Hereinafter, an example is shown in which an image is automatically transmitted from the imaging apparatus 100 to the information processing apparatus 200 at a timing that the contact between the imaging apparatus 100 and the information processing apparatus 200 is detected based on the facial information of a person (individual facial information) which is associated with the information processing apparatus 200.

"Example of Content of Individual Facial Information Management File"

FIG. 12 is a diagram schematically illustrating an example of content of an individual facial information management file 400 which is stored in the storage unit 130 of the imaging apparatus 100 according to the embodiment of the present disclosure.

In the individual facial information management file 400, terminal identification information 401 and individual facial information 402 are stored after being associated with each other. Meanwhile, the terminal identification information 401 and the individual facial information 402 correspond to the terminal identification information 303 and the individual facial information 305 illustrated in FIG. 6.

As above, when the terminal identification information 401 and the individual facial information 402 are stored in the individual facial information management file 400 after being associated with each other, it is possible to associate the information processing apparatus with an owner thereof.

"Example of Operation of Imaging Apparatus"

Figure 13:
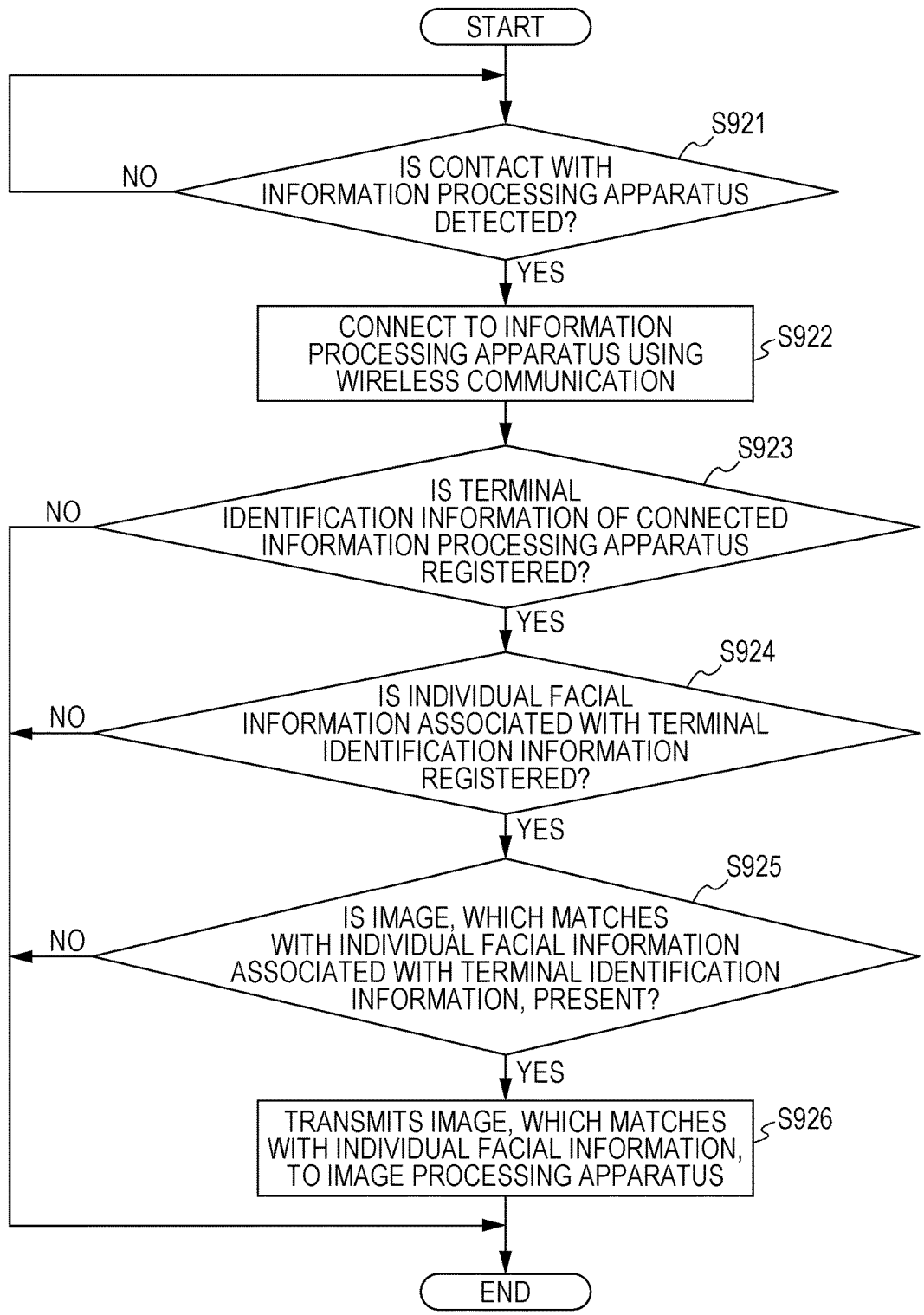
FIG. 13 is a flowchart illustrating an example of the process procedure of the image transmission process performed by the imaging apparatus according to the embodiment of the present disclosure.

FIG. 13 is a flowchart illustrating an example of the process procedure of the image transmission process performed by the imaging apparatus 100 according to the embodiment of the present disclosure. FIG. 13 illustrates an example in which an image, which matches the individual facial information associated with an information processing apparatus, the contact (or approach) of which is detected, is transmitted to the information processing apparatus. In addition, FIG. 13 illustrates an example of a case in which the image transmission mode is set up in the imaging apparatus 100. Meanwhile, since steps S921 and S922 correspond to steps S901 and S902 illustrated in FIG. 10, the description thereof will not be repeated here.

Here, it is assumed that the terminal identification information of the information processing apparatus is transmitted from the information processing apparatus to the imaging apparatus 100 according as the contact of the information processing apparatus is detected (step S921). For example, the terminal identification information of the information processing apparatus is transmitted from the information processing apparatus to the imaging apparatus 100 using NFC or Wi-Fi.

The control unit 140 determines whether or not the terminal identification information of the information processing apparatus, which is connected by wireless communication, is registered (step S923). For example, it is determined whether or not the terminal identification information of the connected information processing apparatus is stored in the terminal identification information 401 of the individual facial information management file 400 illustrated in FIG. 12.

When the terminal identification information of the connected information processing apparatus is registered (step S923), the control unit 140 determines whether or not individual facial information is associated with the terminal identification information (step S924). For example, it is determined whether or not the individual facial information is stored in the individual facial information 402 of the individual facial information management file 400 illustrated in FIG. 12.

When the individual facial information is associated with the terminal identification information (step S924), the control unit 140 determines whether or not an image, which matches the individual facial information associated with the terminal identification information, is stored in the storage unit 130 (step S925). For example, the control unit 140 determines whether or not information, which matches the individual facial information associated with the terminal identification information of the connected information processing apparatus, is present in the individual facial information 305 of the content management file 300 illustrated in FIG. 6.

When the image, which matches the individual facial information associated with the terminal identification information, is stored in the storage unit 130 (step S925), the control unit 140 reads the matching image from the storage unit 130, and transmits the read image to the connected information processing apparatus (step S926).

In addition, when the terminal identification information of the connected information processing apparatus is not registered (step S923), the operation of the image transmission process ends. Similarly, when the individual facial information is not associated with the terminal identification information of the connected information processing apparatus (step S924), the operation of the image transmission process ends. Similarly, when the image, which matches the individual facial information associated with the terminal identification information of the connected information processing apparatus, is not stored in the storage unit 130 (step S925), the operation of the image transmission process ends.

As above, the control unit 140 extracts the image (content), which is associated with the user of another information processing apparatus, from the storage unit 130 based on the individual identification information included in the metadata, and transmits the extracted image to another information processing apparatus.

"Example in which One Imaging Apparatus is Shared and Used by Plurality of Users"

For example, it is assumed that one imaging apparatus 100 is shared and used by a plurality of users. For example, it is assumed that the imaging apparatus 100 is connected to one of a plurality of information processing apparatuses (including the information processing apparatus 200) using wireless communication and an imaging operation is sequentially performed.

As above, when the plurality of users use one imaging apparatus 100 in common, it is assumed that each of the information processing apparatuses acquires the image, which is stored in the storage unit 130 of the imaging apparatus 100, after the imaging operation is performed. For example, it is assumed that the user of the information processing apparatus asks an image which is photographed by the user. Hereinafter, an example is shown in which an image photographed by the user is distinguished from an image photographed by another person and in which the image photographed by the user is easily acquired.

"Example of Operation of Imaging Apparatus"

Figure 14:
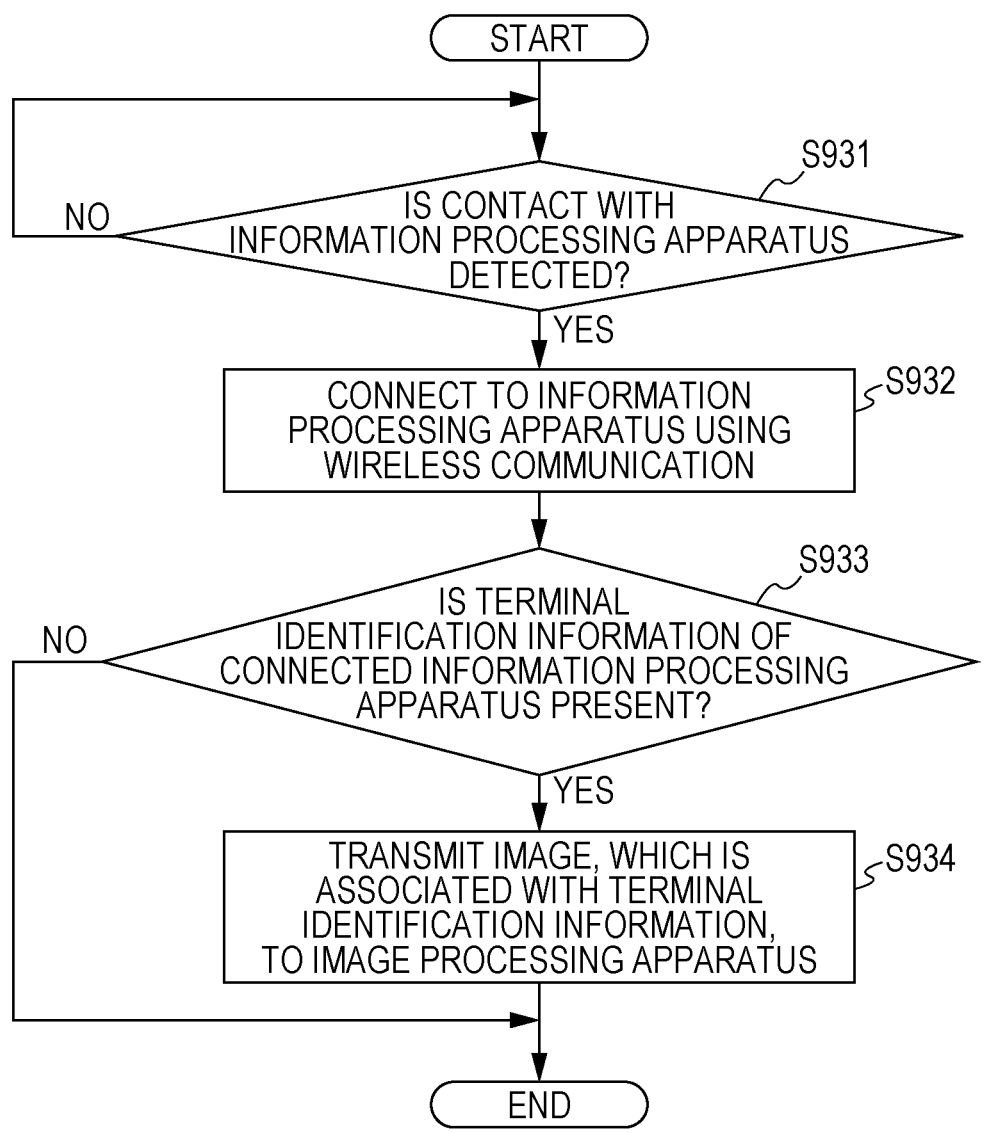
FIG. 14 is a flowchart illustrating an example of the process procedure of the image transmission process performed by the imaging apparatus according to the embodiment of the present disclosure.

FIG. 14 is a flowchart illustrating an example of the process procedure of the image transmission process performed by the imaging apparatus 100 according to the embodiment of the present disclosure. FIG. 14 illustrates an example in which the image associated with the terminal identification information of the information processing apparatus, the contact (or approach) of which is detected, is transmitted to the information processing apparatus. In addition, FIG. 14 illustrates an example in which the image transmission mode is set up in the imaging apparatus 100. Meanwhile, since steps S931 and S932 correspond to steps S901 and S902 illustrated in FIG. 10, the description thereof will not be repeated here.

Here, the terminal identification information of the information processing apparatus is transmitted from the information processing apparatus to the imaging apparatus 100 according as the contact of the information processing apparatus is detected (step S931). For example, the terminal identification information of the information processing apparatus is transmitted from the information processing apparatus to the imaging apparatus 100 using NFC or Wi-Fi.

The control unit 140 determines whether or not the terminal identification information of the information processing apparatus which is connected by wireless communication is registered (step S933). For example, it is determined whether or not the terminal identification information of the connected information processing apparatus is stored in the terminal identification information 303 of the content management file 300 illustrated in FIG. 6.

When the terminal identification information of the connected information processing apparatus is registered (step S933), the control unit 140 reads the image, which is stored after being associated with the terminal identification information, from the storage unit 130. Further, the control unit 140 transmits the read image to the connected information processing apparatus (step S934).

In addition, when the terminal identification information of the connected information processing apparatus is not registered (step S933), the operation of the image transmission process ends.

As above, when one imaging apparatus 100 is shared by the plurality of users, it is possible to easily acquire the image, photographed by the user, by causing the information processing apparatus to come into contact with (or approach) the imaging apparatus 100. In addition, in this case, an image, which is photographed by another person, is not transmitted to the user's information processing apparatus. Therefore, it is possible to reduce time that photographs are sorted out after the image is transmitted.

"Example in which One Imaging Apparatus and Plurality of Information Processing Apparatuses are Simultaneously Connected and Used"

Figure 15A:
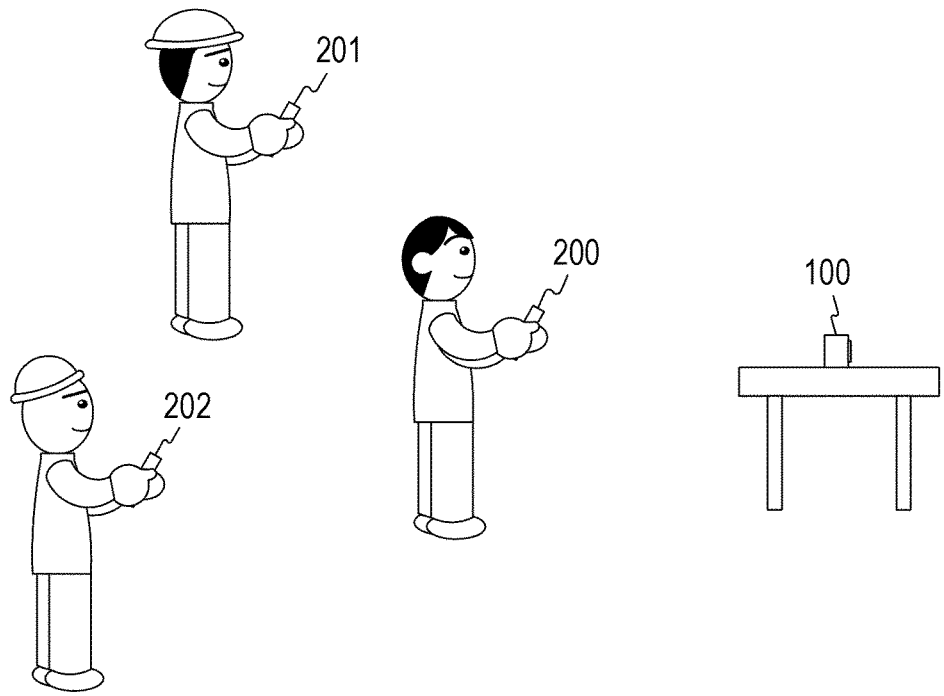
FIG. 15 is a diagram illustrating an example of a case in which an imaging operation is performed by simultaneously connecting the imaging apparatus and a plurality of information processing apparatuses according to the embodiment of the present disclosure.
Figure 15B:
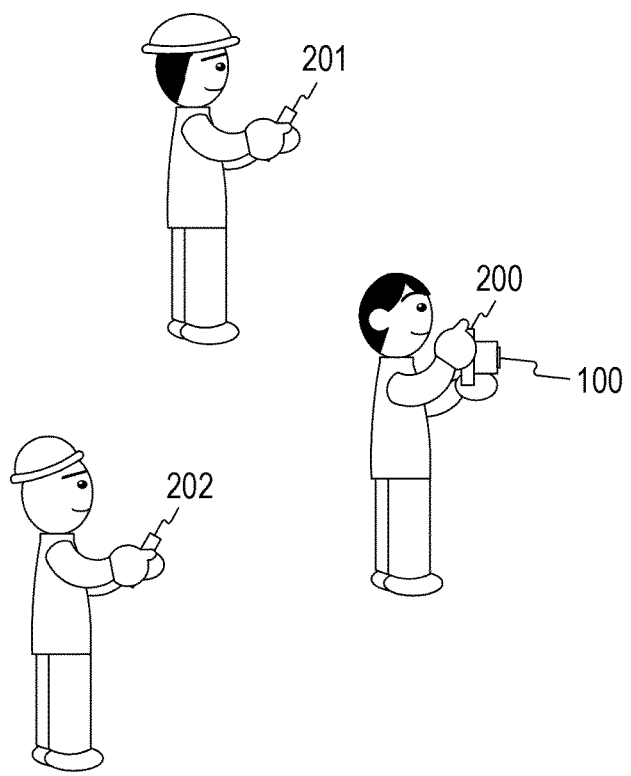

FIGS. 15A and 15B are diagrams illustrating an example of a case in which an imaging operation is performed by simultaneously connecting the imaging apparatus 100 and a plurality of information processing apparatuses 200 to 202 according to the embodiment of the present disclosure.

FIG. 15A illustrates an example of a case in which the imaging apparatus 100 is used after being installed in a place separated from the information processing apparatuses 200 to 202. FIG. 15B illustrates an example of a case in which the imaging apparatus 100 is used after being mounted on the information processing apparatus 200.

As above, when the imaging operation is performed by simultaneously connecting the imaging apparatus 100 and the plurality of information processing apparatuses 200 to 202, for example, it is possible for the imaging apparatus 100 to perform a recording process based on a recording instruction in one or more information processing apparatuses.

A case is assumed in which each of the information processing apparatuses acquires an image, which is stored in the storage unit 130 of the imaging apparatus 100, after the imaging operation is performed using the plurality of information processing apparatuses 200 to 202 and one imaging apparatus 100 as above. For example, a case is assumed in which a user of the information processing apparatus 200 asks an image which is instructed to be recorded by the user. Hereinafter, an example is shown in which the image, which is instructed to be recorded by the user, is separated from an image, which is instructed to be recorded by another user, and thus the image, which is instructed to be recorded by the user, is easily acquired.

"Example of Content of Content Management File"

FIG. 16 is a diagram schematically illustrating an example of the content of a content management file 500 which is stored in the storage unit 130 of the imaging apparatus 100 according to the embodiment of the present disclosure. In the example, the content management file 500 is used instead of the content management file 300 illustrated in FIG. 6.

Content identification information 501, photographed date 502, record instructing terminal identification information 503, and connected terminal identification information 504 are associated with each other and stored in the content management file 500. Meanwhile, the content identification information 501 and the photographed date 502 correspond to the content identification information 301 and the photographed date 302 illustrated in FIG. 6.

The record instructing terminal identification information 503 is information for identifying a terminal (information processing apparatus) which instructs to record content recorded in the storage unit 130.

The connected terminal identification information 504 is information for identifying terminal (information processing apparatus) which is connected to the imaging apparatus 100 when the content recording process is performed.

Meanwhile, although the scene information, individual facial information, and the like are not shown in the drawing in FIG. 16, the respective pieces of information may be stored as the metadata of content or other pieces of information related to content may be stored as the metadata of content, similarly to FIG. 6.

"Example of Operation of Imaging Apparatus"

FIG. 17 is a flowchart illustrating an example of the process procedure of an image recording process performed by the imaging apparatus 100 according to the embodiment of the present disclosure. FIG. 17 illustrates an example of a case in which a plurality of information processing apparatuses are connected to the imaging apparatus 100. In addition, FIG. 17 illustrates an example of case in which a still image recording mode is set up in the imaging apparatus 100.

Initially, the control unit 140 determines whether or not a recording instruction is transmitted from at least one of the plurality of connected information processing apparatuses using wireless communication (step S941). When the recording instruction is not transmitted (step S941), monitoring is continued.

When the recording instruction is transmitted (step S941), the control unit 140 performs a recording process to record an image, which is generated by the imaging unit 110, in the storage unit 130 (step S942). Here, together with the (simultaneous or sequential) transmission of the recording instruction, the terminal identification information of the information processing apparatus which transmits the recording instruction is transmitted from the information processing apparatus to the imaging apparatus 100. For example, the terminal identification information of the information processing apparatus, which transmits the recording instruction using Wi-Fi, is transmitted from the information processing apparatus to the imaging apparatus 100. In addition, the terminal identification information of each of the information processing apparatuses, which are connected to the imaging apparatus 100, is transmitted from each of the information processing apparatuses to the imaging apparatus 100. For example, at any one of a timing before an image is photographed, a timing when the image is recorded, and a timing after the image is recorded sequentially or at a plurality of timings, the terminal identification information of each of the information processing apparatuses, which are connected to the imaging apparatus 100, is sequentially transmitted to the imaging apparatus 100.

Subsequently, the control unit 140 associates the terminal identification information of the information processing apparatus, which transmits the recording instruction, with an image which is a target of the recording process and records the terminal identification information (step S943). For example, the control unit 140 stores the terminal identification information of the information processing apparatus, which transmits the recording instruction, in the record instructing terminal identification information 503 of the content management file 500 illustrated in FIG. 16.

Subsequently, the control unit 140 associates the terminal identification information of the information processing apparatus, which is connected when the recording instruction is received, with the image which is a target of the recording process, and records the terminal identification information of the information processing apparatus (step S944). For example, the control unit 140 records the terminal identification information of the information processing apparatus, which is connected when the recording instruction is received, in the connected terminal identification information 504 of the content management file 500 illustrated in FIG. 16.

As above, if the imaging apparatus 100 is connected to the plurality of information processing apparatuses when the recording instruction is performed, the control unit 140 records identification information for identifying the information processing apparatus, which performs the recording instruction, from among a plurality of information processing apparatuses as the metadata. In addition, if the imaging apparatus 100 is connected to the plurality of information processing apparatuses when the recording instruction is performed, the control unit 140 records identification information for identifying each of the plurality of information processing apparatuses including the information processing apparatus, which performs the recording instruction, as the metadata.

"Example of Operation of Imaging Apparatus"

FIG. 18 is a flowchart illustrating an example of the process procedure of the image transmission process performed by the imaging apparatus 100 according to the embodiment of the present disclosure. FIG. 18 illustrates an example in which an image, which is associated with the terminal identification information of the information processing apparatus which performs the recording instruction, is transmitted to the information processing apparatus. In addition, FIG. 18 illustrates an example of a case in which the image transmission mode is set up in the imaging apparatus 100. Meanwhile, since steps S951 and S952 correspond to steps S901 and S902 illustrated in FIG. 10, the description thereof will not be repeated here.

Here, the terminal identification information of the information processing apparatus is transmitted from the information processing apparatus to the imaging apparatus 100 according as the contact of information processing apparatus is detected (step S941). For example, the terminal identification information of the information processing apparatus is transmitted from the information processing apparatus to the imaging apparatus 100 using NFC or Wi-Fi.

The control unit 140 determines whether or not the terminal identification information of the information processing apparatus, which is connected by wireless communication, is registered (step S953). For example, it is determined whether or not the terminal identification information of the connected information processing apparatus is stored in the record instructing terminal identification information 503 or the connected terminal identification information 504 of the content management file 500 illustrated in FIG. 16.

When the terminal identification information of the connected information processing apparatus is registered (step S953), the control unit 140 determines whether or not the terminal identification information is stored as the record instructing terminal identification information (step S954). For example, it is determined whether or not the terminal identification information of the connected information processing apparatus is stored in the record instructing terminal identification information 503 of the content management file 500 illustrated in FIG. 16.

When the terminal identification information is stored as the record instructing terminal identification information (step S954), the control unit 140 reads an image, in which the terminal identification information is stored as the record instructing terminal identification information, from the storage unit 130. Further, the control unit 140 transmits the read image to the connected information processing apparatus (step S955).

In addition, when the terminal identification information of the connected information processing apparatus is not registered (step S953), the operation of the image transmission process ends. Similarly, when the terminal identification information is not stored as the record instructing terminal identification information (step S954), the operation of the image transmission process ends.

As above, the control unit 140 transmits an image, which is associated with the identification information pertaining to the connected information processing apparatus, to the information processing apparatus from among images which are stored in the storage unit 130.

"Example of Operation of Imaging Apparatus"

FIG. 19 is a flowchart illustrating an example of the process procedure of the image transmission process performed by the imaging apparatus 100 according to the embodiment of the present disclosure. FIG. 19 illustrates an example in which an image, which is associated with the terminal identification information of the information processing apparatus connected when the recording instruction is performed, is transmitted to the information processing apparatus. In addition, FIG. 19 illustrates an example of a case in which the image transmission mode is set up in the imaging apparatus 100. Meanwhile, since steps S961, S962, and S963 correspond to steps S951, S952, and S953 illustrated in FIG. 18, the description thereof will not be repeated here.

When the terminal identification information of the connected information processing apparatus is registered (step S963), the control unit 140 determines whether or not the terminal identification information is stored as the connected terminal identification information (step S964). For example, it is determined whether or not the terminal identification information of the connected information processing apparatus is stored in the connected terminal identification information 504 of the content management file 500 illustrated in FIG. 16.

When the terminal identification information is stored as the connected terminal identification information (step S964), the control unit 140 reads an image, in which the terminal identification information is stored as the connected terminal identification information, from the storage unit 130. Further, the control unit 140 transmits the read image to the connected information processing apparatus (step S965).

In addition, when the terminal identification information is not stored as the connected terminal identification information (step S964), the operation of the image transmission process ends.

As above, the control unit 140 transmits an image, which is associated with the identification information pertaining to the connected information processing apparatus, to the information processing apparatus from among images which are recorded in the storage unit 130.

Meanwhile, in the embodiment according to the present disclosure, an example, in which the imaging apparatus 100 determines an image which is a transmission target and transmits the image, is shown. However, the information processing apparatus 200 may determine an image which is a transmission target and may acquire the image. For example, imaging apparatus 100 transmits information related to content (for example, metadata (for example, content management file 300 illustrated in FIG. 6)) to the information processing apparatus 200. Further, the information processing apparatus 200 determines an image which is a transmission target based on the information related to content, and transmits the result of determination to the imaging apparatus 100. In this case, the imaging apparatus 100 reads the image which is a transmission target from the storage unit 130 and transmits the image to the information processing apparatus 200 based on the result of the determination performed by the information processing apparatus 200.

As above, according to the embodiment of the present disclosure, when content, which is stored in the storage unit 130 of the imaging apparatus 100, is transmitted to the information processing apparatus 200, it is possible to easily select content which is a transmission target. Therefore, it is possible to appropriately transmit content from the imaging apparatus 100 to the information processing apparatus 200.

Meanwhile, although the cylindrical (column-shaped) imaging apparatus 100 has been described as an example in the embodiment according to the present disclosure, it is possible to apply the embodiment of the present disclosure to another shaped imaging apparatus which can be attached to another apparatus. In addition, it is possible to apply the embodiment of the present disclosure to an image apparatus which can be connected to another apparatus using wireless communication (for example, Wi-Fi). In addition, although the information processing apparatus 200, such as a smart phone or a tablet terminal, has been described as an example in the embodiment according to the present disclosure, it is possible to apply the embodiment of the present disclosure to another apparatus which can be connected to the imaging apparatus using wireless communication.

Meanwhile, the above-described embodiment is illustrated as an example for implementing the present disclosure, and matters in the embodiment respectively correspond to matters used to specify the disclosure in claims. Similarly, the matters used to specify the disclosure in claims respectively correspond to matters, to which the same names are attached, in the embodiment of the present disclosure. However, the present disclosure is not limited to the embodiment and can be implemented by performing various modifications on the embodiment without departing from the gist of the present disclosure.

In addition, the process procedure described in the above-described embodiment may be perceived as a method including the series of procedures, and may be perceived as a program which causes a computer to perform the series of procedures or a recording medium which stores the program. For example, it is possible to use a Compact Disc (CD), a MiniDisc (MD), a Digital Versatile Disc (DVD), a memory card, a Blu-ray (registered trademark) Disc, or the like as the recording medium.

Meanwhile, effects disclosed in the specification are only examples, and are not limited. In addition, another effect may exist.

Meanwhile, the present disclosure may include configurations as below.

(1)

An information processing apparatus including:

a control unit that performs control such that content which is recorded in a recording medium is transmitted to another information processing apparatus based on metadata related to the content, which is generated by an operation using the other information processing apparatus and which is recorded in the recording medium, when contact or approach of the other information processing apparatus is detected using short-distance wireless communication.

(2)

In the information processing apparatus (1), the control unit performs a recording process of the content, which is generated by the operation based on a recording instruction from the other information processing apparatus which is connected by the wireless communication, on the recording medium, records identification information for identifying the other information processing apparatus after associating the identification information with the content as the metadata.

(3)

In the information processing apparatus (2), if the information processing apparatus is connected to a plurality of information processing apparatuses when the recording instruction is performed, the control unit records the identification information for identifying the other information processing apparatus, which performs the recording instruction, from among the plurality of information processing apparatuses as the metadata.

(4)

In the information processing apparatus (2), if the information processing apparatus is connected to a plurality of information processing apparatuses when the recording instruction is performed, the control unit records the identification information for identifying the respective information processing apparatuses including the other information processing apparatus which performs the recording instruction as the metadata.

(5)

In the information processing apparatus of any one of (2) to (4), the control unit transmits content which is associated with the identification information pertaining to the other information processing apparatus from among the content which is recorded in the recording medium.

(6)

In the information processing apparatus (5), the control unit receives the identification information, which is transmitted from the other information processing apparatus according as the contact or approach is detected, and selects content to be transmitted to the other information processing apparatus based on the identification information.

(7)

In the information processing apparatus of any one of (1) to (6), the control unit extracts content which satisfies a transmission condition from the recording medium based on the metadata, and transmits the content to the other information processing apparatus.

(8)

In the information processing apparatus (7), the control unit extracts the content which satisfies the transmission condition from the recording medium using at least one of a date on which the content is generated, an attribute of a subject which is included in the content, and a fact whether or not a person is included in the content.

(9)

In the information processing apparatus of any one of (1) to (4), the control unit extracts content, which is related to a user of the other information processing apparatus, from the recording medium based on individual identification information included in the metadata, and transmits the content to the other information processing apparatus.

(10)

In the information processing apparatus of any one of (1) to (9), the control unit transmits the content, which is recorded in the recording medium, to the other information processing apparatus which comes into contact with or approaches the information processing apparatus.

(11)

The information processing apparatus of any one of (1) to (10) further includes an imaging unit that images a subject and generates content which includes the subject, and the control unit associates the generated content with the metadata, which is related to the content, and records the generated content in the recording medium.

(12)

An information processing system including: an imaging apparatus that transmits content, which is recorded in a recording medium, to a contacting or approaching information processing apparatus based on metadata related to the content, which is generated by an operation using the information processing apparatus and which is recorded in the recording medium, when contact or approach of the other information processing apparatus is detected using short-distance wireless communication; and the information processing apparatus that displays the content, which is transmitted from the imaging apparatus, on a display unit.

(13)

A method for controlling an information processing apparatus including transmitting content, which is recorded in a recording medium, to another information processing apparatus based on metadata related to the content, which is generated by an operation using the other information processing apparatus and which is recorded in the recording medium, when contact or approach of the other information processing apparatus is detected using short-distance wireless communication.

(14)

A program causing a computer to perform a transmission procedure in which content, which is recorded in a recording medium, to another information processing apparatus based on metadata related to the content, which is generated by an operation using the other information processing apparatus and which is recorded in the recording medium, when contact or approach of the other information processing apparatus is detected using short-distance wireless communication.

(15)

An information processing apparatus, comprising:
circuitry configured to transmit at least one content based on at least one metadata related to the at least one content to a first external device in a case that the information processing apparatus is in proximity with the first external device, wherein the at least one content is generated and recorded with the at least one metadata in a storage medium of the information processing apparatus based on an operation of the first external device.

The proximity of the first external device can be determined by various alternative wireless communication technologies that are used to connect the information processing apparatus and the first external device in a range of contact or approach. Such wireless communication technologies include NFC, Bluetooth, infrared, or any other short-distance wireless communications.

(16)

In the information processing apparatus (15), the proximity of the first external device is detected by short-distance wireless communication.

(17)

In the information processing apparatus of any one of (15) to (16), the circuitry is configured to receive a recording request from the first external device, and in response to the recording request the at least one content is generated and recorded with the at least one metadata in the storage medium.

(18)

In the information processing apparatus of any one of (15) to (17), the information processing apparatus is configured to connect with a plurality of external devices including the first external device.

(19)

In the information processing apparatus of any one of (15) to (18), the at least one metadata includes terminal identification information to identify the first external device configured to send the recording request.

(20)

In the information processing apparatus of any one of (15) to (19), the circuitry transmits the at least one content which is associated with the terminal identification information to identify the first external device in a case that the information processing apparatus is in proximity with the first external device.

(21)

In the information processing apparatus of any one of (15) to (20), the circuitry receives the terminal identification information in the case that the information processing apparatus is in proximity with the first external device and transmits the at least one content which is associated with the terminal identification information received by the circuitry.

(22)

The information processing apparatus of any one of (15) to (21) further comprises an imager configured to capture at least one image, wherein based on the operation of the first external device the at least one image is captured and recorded with the at least one metadata in the storage medium.

(23)

The information processing apparatus of any one of (15) to (22) comprises one of a lens-style camera and an action camera.

(24)

In the information processing apparatus of any one of (15) to (23), the at least one metadata comprises at least one of content identification information, a photographed date, terminal identification information, scene information, and individual facial information.

(25)

In the information processing apparatus (24), the scene information is related to a scene of the content and comprises at least one of a facial picture, a group picture, and a landscape picture.

(26)

In the information processing apparatus (25), the scene of the content is automatically determined and stored using an image recognition technology.

(27)

In the information processing apparatus of any one of (15) to (26), the storage medium is detachably connected to the information processing apparatus.

(28)

In the information processing apparatus of any one of (15) to (27), the at least one content is transmitted by long-distance wireless communication.

(29)

A method of transmitting images performed by an information processing apparatus having circuitry and a storage medium, comprising:
transmitting at least one content based on at least one metadata related to the at least one content to a first external device in a case that the information processing apparatus is in proximity with the first external device wherein the at least one content is generated and recorded with the at least one metadata in a storage medium of the information processing apparatus based on an operation of the first external device.

(30)

In the method (29), the proximity of the first external device is detected by short-distance wireless communication.

(31)

In the method of any one of (29) to (30), the information processing apparatus comprises one of a lens-style camera and an action camera.

(32)

In the method of any one of (29) to (31), the at least one metadata comprises at least one of content identification information, a photographed date, terminal identification information, scene information, and individual facial information.

(33)

A system of transmitting an image, comprising:
a first information processing apparatus having first circuitry and a storage medium; and
a second information processing apparatus,
wherein in a case that the first information processing apparatus is in proximity with the second information processing apparatus, the first circuitry is configured to transmit at least one content based on at least one metadata related to the at least one content to the second information processing apparatus, and wherein the at least one content is generated and recorded with the at least one metadata in the first storage medium based on an operation of the second information processing apparatus.

(34)

A computer program product comprising a non-transitory computer readable medium that stores program code executable for performing operations comprising: transmitting at least one content based on at least one metadata related to the at least one content from the information processing apparatus to the first external device in a case that the information processing apparatus is in proximity with the first external device wherein the at least one content is generated and recorded with the at least one metadata in a storage medium of the information processing apparatus based on an operation of the first external device.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Imaging apparatus
110 Imaging unit
120 Image processing unit
130 Storage unit
140 Control unit
150 Wireless communication unit
160 Operation reception unit
161 to 163 Operation member
170 Lens-barrel
180 Adapter
181, 182 Mounting member
200 to 202 Information processing apparatus
210 Posture detection unit
220 Operation reception unit
221 to 223 Operation member
230 Wireless communication unit
240 Input/output unit
241 Input unit
242 Display unit
250 Control unit
260 Image processing unit
270 Storage unit
280 Voice output unit
291 Light emitting unit
292 Imaging unit

The invention claimed is:

1. An information processing apparatus, comprising:
an imaging unit;
a storage medium; and
circuitry configured to
    receive control information from a first external device,
    control the imaging unit to image a subject and generate at least one content with at least one metadata based on the control information,
    record the at least one content with the at least one metadata in the storage medium,
    determine whether the first external device is within a proximity threshold relative to the information processing apparatus, and
    transmit the at least one content to the first external device based on the at least one metadata in response to determining that the first external device is within the proximity threshold.

2. The information processing apparatus according to claim 1, wherein, to determine whether the first external device is within the proximity threshold, the circuitry is further configured to determine a proximity of the first external device by differentiating between short-distance wireless communication and long-distance wireless communication.

3. The information processing apparatus according to claim 1, wherein the control information from the first external device is a recording request from the first external device.

4. The information processing apparatus according to claim 3, wherein the circuitry is further configured to communicatively connect with a plurality of external devices including the first external device.

5. The information processing apparatus according to claim 4, wherein the at least one metadata includes terminal identification information to identify one of the plurality of external devices.

6. The information processing apparatus according to claim 5, wherein, to transmit the at least one content to the first external device based on the at least one metadata in response to determining that the first external device is within the proximity threshold, the circuitry is further configured to transmit the at least one content based on the terminal identification information that identifies the first external device.

7. The information processing apparatus according to claim 6, wherein, to receive the control information from the first external device, the circuitry is further configured to receive the terminal identification information.

8. The information processing apparatus according to claim 1, wherein the imaging unit is one of a lens-style camera or an action camera.

9. The information processing apparatus according to claim 1, wherein the at least one metadata comprises at least one of content identification information, a photographed date, terminal identification information, scene information, and individual facial information.

10. The information processing apparatus according to claim 9, wherein the scene information is related to a scene of the at least one content, and wherein the scene comprises at least one of a facial picture, a group picture, and a landscape picture.

11. The information processing apparatus according to claim 10, wherein the circuitry is further configured to
    perform image recognition to determine the scene of the at least one content, and
    store the scene in the storage medium.

12. The information processing apparatus according to claim 1, wherein the storage medium is detachably connected to the circuitry.

13. The information processing apparatus according to claim 1, wherein the circuitry is further configured to transmit the at least one content using long-distance wireless communication.

14. The information processing apparatus according to claim 1, wherein the at least one content does not include audio content.

15. The information processing apparatus according to claim 1, wherein the at least one content is only image content.

16. A method of transmitting content performed by an information processing apparatus having, an imaging unit, circuitry, and a storage medium, the method comprising:
receiving, with the circuitry of the information processing apparatus, control information from a first external device;
controlling, with the circuitry, the imaging unit to generate at least one content with at least one metadata based on the control information;
recording, with the storage medium of the information processing apparatus, the at least one content with the at least one metadata;
determining whether the first external device is within a proximity threshold relative to the information processing apparatus; and
transmitting the at least one content to the first external device based on the at least one metadata in response to determining that the first external device is within the proximity threshold.

17. The method according to claim 16, wherein determining whether the first external device is within the proximity threshold further includes determining a proximity of the first external device by differentiating between short-distance wireless communication and long-distance wireless communication.

18. The method according to claim 16, wherein controlling the imaging unit to generate the at least one content with the at least one metadata based on the control information further includes generating at least one image using one of a lens-style camera or an action camera.

19. The method according to claim 16, wherein the at least one metadata comprises at least one of content identification information, a photographed date, terminal identification information, scene information, and individual facial information.

20. A system comprising:
a first information processing apparatus configured to transmit control information; and
a second information processing apparatus including an imaging unit, a storage medium, and circuitry, the circuitry configured to
receive the control information from the first information processing apparatus,
control the imaging unit to image a subject and generate at least one content with at least one metadata based on the control information,
record the at least one content with the at least one metadata in the storage medium,
determine whether the first information processing apparatus is within a proximity threshold relative to the second information processing apparatus, and
transmit the at least one content to the first information processing apparatus based on the at least one metadata in response to determining that the first information processing apparatus is within the proximity threshold.

21. A computer program product comprising a non-transitory computer readable medium that stores program code executable by an electronic processor for performing a set of operations comprising:
receiving control information from a first external device;
controlling an imaging unit of an information processing apparatus to image a subject and generate at least one content with at least one metadata based on the control information;
recording the at least one content with the at least one metadata in a storage medium of the information processing apparatus;
determining whether the first external device is within a proximity threshold relative to the information processing apparatus; and
transmitting the at least one content to the first external device based on the at least one metadata in response to determining that the first external device is within the proximity threshold.

* * * * *